(12) United States Patent
Oshikiri et al.

(10) Patent No.: US 7,536,489 B2
(45) Date of Patent: May 19, 2009

(54) INFORMATION PROCESSING SYSTEM FOR DETERMINING PAYLOAD SIZE BASED ON PACKET-TO-PAYLOAD SIZE RATIO

(75) Inventors: Koji Oshikiri, Miyagi (JP); Noriyuki Terao, Miyagi (JP); Junichi Ikeda, Miyagi (JP); Koji Takeo, Miyagi (JP)

(73) Assignee: Ricoh Company Limited, Tokyo (JP)

( * ) Notice: Subject to any disclaimer, the term of this patent is extended or adjusted under 35 U.S.C. 154(b) by 111 days.

(21) Appl. No.: 11/511,477

(22) Filed: Aug. 29, 2006

(65) Prior Publication Data

US 2007/0088873 A1    Apr. 19, 2007

(30) Foreign Application Priority Data

Aug. 30, 2005    (JP)    ............................. 2005-249170
Aug. 30, 2005    (JP)    ............................. 2005-249171

(51) Int. Cl.
*H04J 3/16* (2006.01)
*H04J 3/24* (2006.01)
*G06F 3/00* (2006.01)
*G06F 5/00* (2006.01)

(52) U.S. Cl. ........................... 710/58; 710/30; 370/470; 370/474

(58) Field of Classification Search ......... 370/229–240, 370/254, 257, 464, 474, 470–473; 710/30, 710/58
See application file for complete search history.

(56) References Cited

U.S. PATENT DOCUMENTS

| 6,058,102 | A | 5/2000 | Drysdale et al. |
| 2002/0064185 | A1 | 5/2002 | Nakai et al. |
| 2002/0131077 | A1 | 9/2002 | Goto |
| 2002/0144042 | A1 | 10/2002 | Garney |
| 2005/0038948 | A1 | 2/2005 | Lueck et al. |
| 2005/0265379 | A1* | 12/2005 | Rao ........................... 370/464 |
| 2006/0159102 | A1* | 7/2006 | Major ..................... 370/395.6 |

FOREIGN PATENT DOCUMENTS

| EP | 0 895 400 | | 2/1999 |
| EP | 1 477 899 | | 11/2004 |
| EP | 1 517 295 | A2 | 3/2005 |
| EP | 1 684 188 | | 7/2006 |

(Continued)

OTHER PUBLICATIONS

PCI Express Base Specification; Mar. 28, 2005; Revision 1.1; pp. 1-508.*

(Continued)

*Primary Examiner*—Niketa I Patel
*Assistant Examiner*—Richard Franklin
(74) *Attorney, Agent, or Firm*—Harness, Dickey, Pierce

(57) ABSTRACT

An information processing system includes a high-speed serial bus that transmits and receives data independently over communication channels via a tree-structured network including a point-to-point connection, and a control unit that issues a request command based on a request synchronization signal for data with a timing constraint on line synchronous transfer by a line synchronization signal to transmit a plurality of data, including the data with the timing constraint, simultaneously via the high-speed serial bus.

9 Claims, 34 Drawing Sheets

FOREIGN PATENT DOCUMENTS

| | | |
|---|---|---|
| GB | 2 407 890 | 5/2005 |
| JP | 2001-016382 | 1/2001 |
| JP | 2003-037608 | 2/2003 |
| JP | 2005-354658 | 12/2005 |

OTHER PUBLICATIONS

PCI Express Base Specification Revision 1.0, Apr. 29, 2002, pp. 1-416.

European Search Report dated Apr. 20, 2007 for corresponding European Application.

"PCI Express Base Specification", PCI Express Base Specification, vol. Rev. 1.0, Apr. 29, 2002, pp. 1-416.

Extended European Search Report dated Jul. 31, 2007.

T. Satoshi "Outline Of The PCI Express Standard" Chapter 4: The Standard Of High Speed Extension Bus In Future (Jul. 2003) Interface Press.

Christian Sauer et al., Developing a Flexible Interface for Rapidio, Hypertransport, and PCI-Express, Proceedings of the International Conference on Parallel Computing in Electrical Engineering (Parelec) '04.

European Search Report with the European Patent Office dated Aug. 6, 2008.

* cited by examiner

PRIOR ART

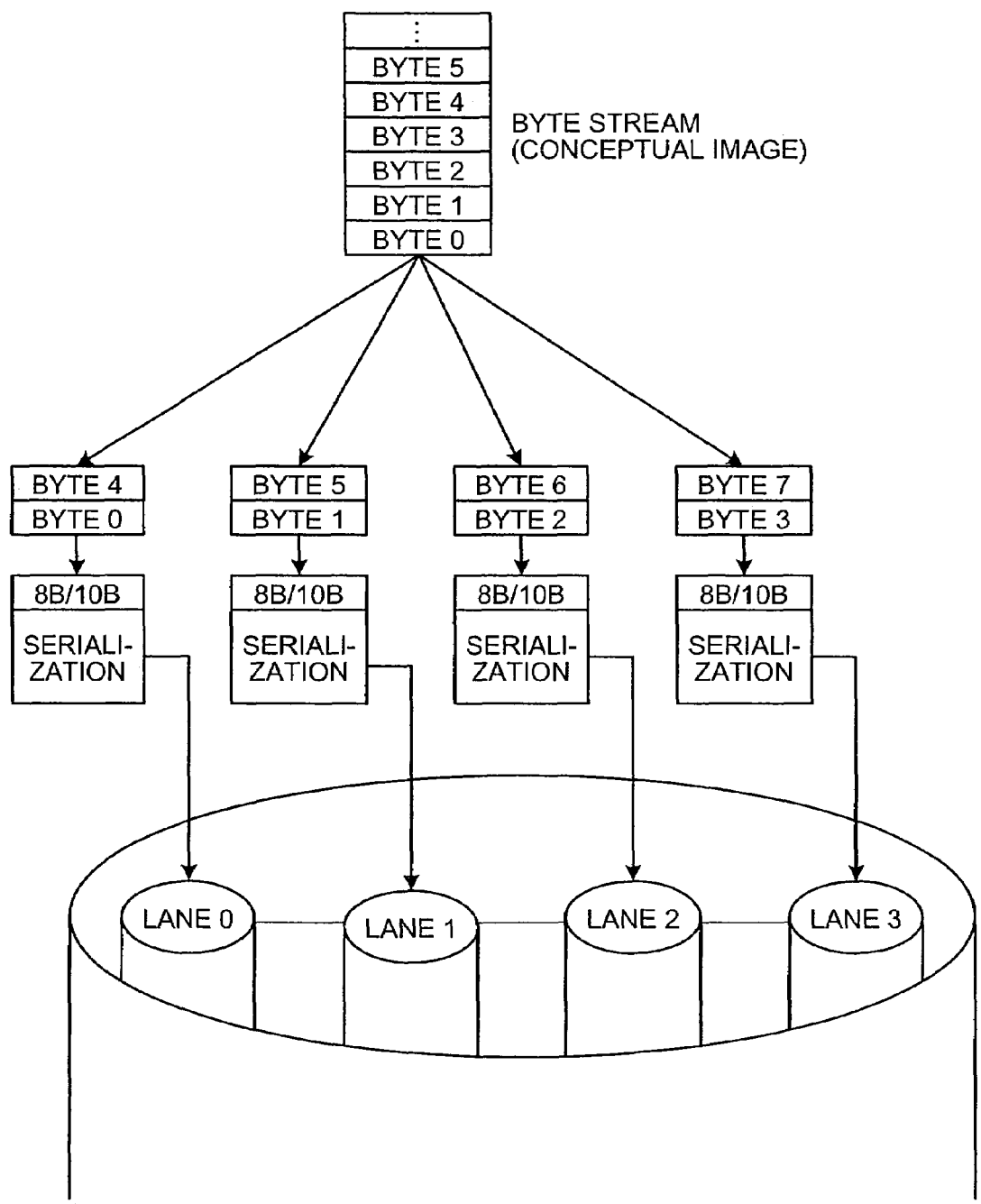

FIG. 14

| STATE | CONDITION | EXPENDED TIME FOR RETURNING TO L0 |
|---|---|---|
| L0 | ACTIVE (NORMAL) | |
| L0S | LINK IS SET AT COMMON MODE VOLTAGE<br>BOTH CLOCK AND MAIN POWER ARE ON | 16 ns TO 4 μs |
| L1 | LINK IS SET AT COMMON MODE VOLTAGE<br>CLOCK IS OFF AND MAIN POWER IS ON | 1 TO SEVERAL 10 μs |
| L2 | BOTH CLOCK AND MAIN POWER ARE OFF<br>SUPPLY VOLTAGE IF ANY AUXILIARY POWER (Vaux) | DEPENDENT ON SYSTEM |

EXPENDED TIME FOR RETURNING FROM L2 TO L0 DEPENDS ON RISING TIME OF POWER AND PLL

FIG. 15

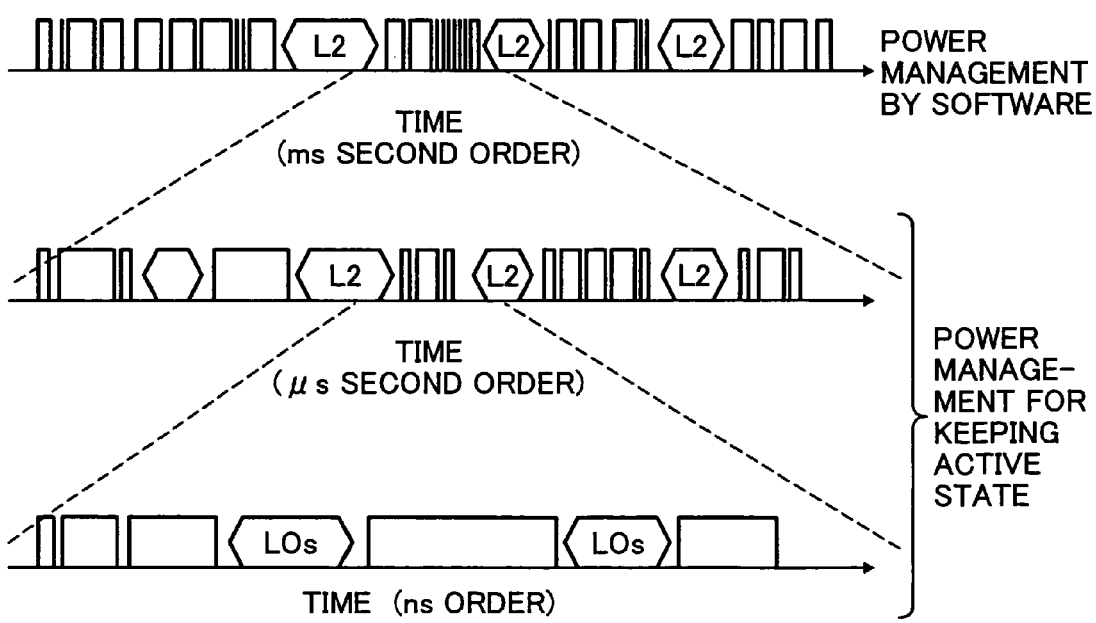

VARIATION DUE TO DIFFERENCE OF INTERNAL STRUCTURE OF SWITCH (MEMORY READ)

DIFFERENCE OF NUMBER OF SWITCHING STEPS AND DELAY CHARACTERISTICS

DIFFERENCE OF NUMBER OF SWITCHING STEPS AND DELAY CHARACTERISTICS

INFORMATION PROCESSING SYSTEM FOR DETERMINING PAYLOAD SIZE BASED ON PACKET-TO-PAYLOAD SIZE RATIO

CROSS-REFERENCE TO RELATED APPLICATIONS

The present document incorporates by reference the entire contents of Japanese priority document, 2005-249170 filed in Japan on Aug. 30, 2005 and 2005-249171 filed in Japan on Aug. 30, 2005.

BACKGROUND OF THE INVENTION

1. Field of the Invention

The present invention relates to an information processing system that processes various types of data.

2. Description of the Related Art

In an information processing system such as a digital copier and an MFP that processes, for example, image data, a Peripheral Component Interconnect (PCI) bus is employed as an interface between devices. However, due to racing, skew, etc., a parallel PCI bus cannot provide a high data transfer rate sufficient for use in an image-forming device required to operate at a high speed and also to produce high quality images.

High-speed serial interfaces such as Institute of Electrical and Electronics Engineers (IEEE) 1394 interface and Universal Serial Bus (USB) are now studied to be used instead of the parallel PCI bus. For example, Japanese Patent Application Laid-Open No. 2001-016382 has proposed a technique using a high-speed serial interface such as the IEEE 1394 interface or the USB as an internal interface.

As another high-speed serial interface, the PCI EXPRESS (trademark), which is a successive version of the PCI bus, has been proposed and is now available for the practical use. Reference may be had to, for example, an article by Hisashi Satomi "An Overview of the PCI EXPRESS standard", taken from journal "Interface", July 2003. The PCI EXPRESS is a data communication network with a tree structure, including a root complex, switch, and the like.

Japanese Patent Application Laid-Open No. 2001-016382, however, does not refer to problems in simultaneous transmission of a plurality of image data sets. Besides, although the technique allows establishing a serial system with a high degree of freedom, in which a plurality of traffic flows occurs, the effects of restrictions on line synchronous transfer timing, etc. are not considered.

SUMMARY OF THE INVENTION

It is an object of the present invention to at least partially solve the problems in the conventional technology.

According to an aspect of the present invention, an information processing system includes a high-speed serial bus that transmits and receives data independently over communication channels via a tree-structured network including a point-to-point connection, and a control unit that issues a request command based on a request synchronization signal for data with a timing constraint on line synchronous transfer by a line synchronization signal to transmit a plurality of data, including the data with the timing constraint, simultaneously via the high-speed serial bus.

According to another aspect of the present invention, an information processing system includes a high-speed serial bus that transmits and receives data independently over communication channels via a tree-structured network including a point-to-point connection, a printer controller, an output unit that receives data from the printer controller to output data, and a control unit that issues a read request command based on a request synchronization signal for data transferred from the printer controller to the output unit in synchronism with a line synchronization signal to transmit a plurality of data, including the data transferred in synchronism with the line synchronization signal, simultaneously via the high-speed serial bus.

According to still another aspect of the present invention, an information processing system includes a high-speed serial bus that transmits and receives data independently over communication channels via a tree-structured network including a point-to-point connection, a first detecting unit that detects a first curve indicating a completion packet-to-payload size ratio T1/T2 based on a time difference T1 from when transmission of a request packet via the high-speed serial bus is started until a header of a completion packet corresponding to the request packet arrives and a time difference T2 from when transmission of the request packet is started until a last completion packet of all target data is received, a second detecting unit that detects a second curve indicating a completion packet-to-payload size ratio A/(A+B) based on a header size A of the completion packet and a payload size B of the completion packet, and a determining unit that determines a payload size for packet transfer with a small loss against a theoretical value of transfer rate based on the first curve and the second curve.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a schematic for explaining byte stripping with an x4 link;

FIG. 14 is a table for explaining definition of link states of L 0, L 0s, L 1, and L 2;

FIG. 15 is a timing chart for explaining control of an active state power management;

DETAILED DESCRIPTION OF THE PREFERRED EMBODIMENTS

Exemplary embodiments of the present invention are described in detail below with reference to the accompanying drawings.

In the following, details of the PCI EXPRESS are described first.

Overview of the PCI EXPRESS Standard

In an embodiment of the present invention, the PCI EXPRESS (trademark), one of high-speed serial buses, is used. Before the description of the embodiment, the overview of the PCI EXPRESS standard is described with reference to an article by Hisashi Satomi "An Overview of the PCI EXPRESS standard", taken from journal "Interface" July 2003. The high-speed serial bus is an interface capable of transmitting data at a high-speed (100 megabits per second or higher) using one serial transmission path.

The PCI EXPRESS is a standardized expansion bus developed as a successive version of the PCI bus, and can be commonly used in computers. The PCI EXPRESS is characterized by the low-voltage differential signal transmission, communication channels allowing independent point-to-point transmission and reception, packetized split transactions, high-scalability making use of differences between link structures, and the like.

Figure 1:
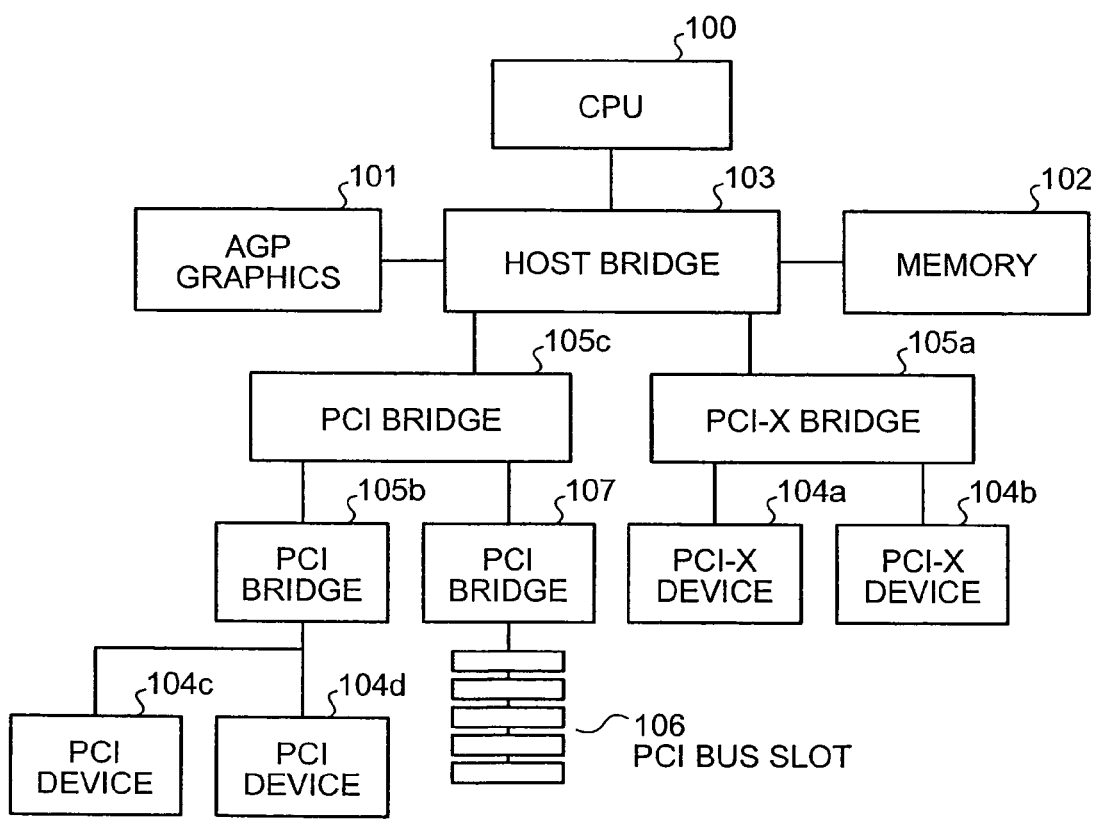
FIG. 1 is a block diagram of an example of a conventional PCI system.
Figure 2:
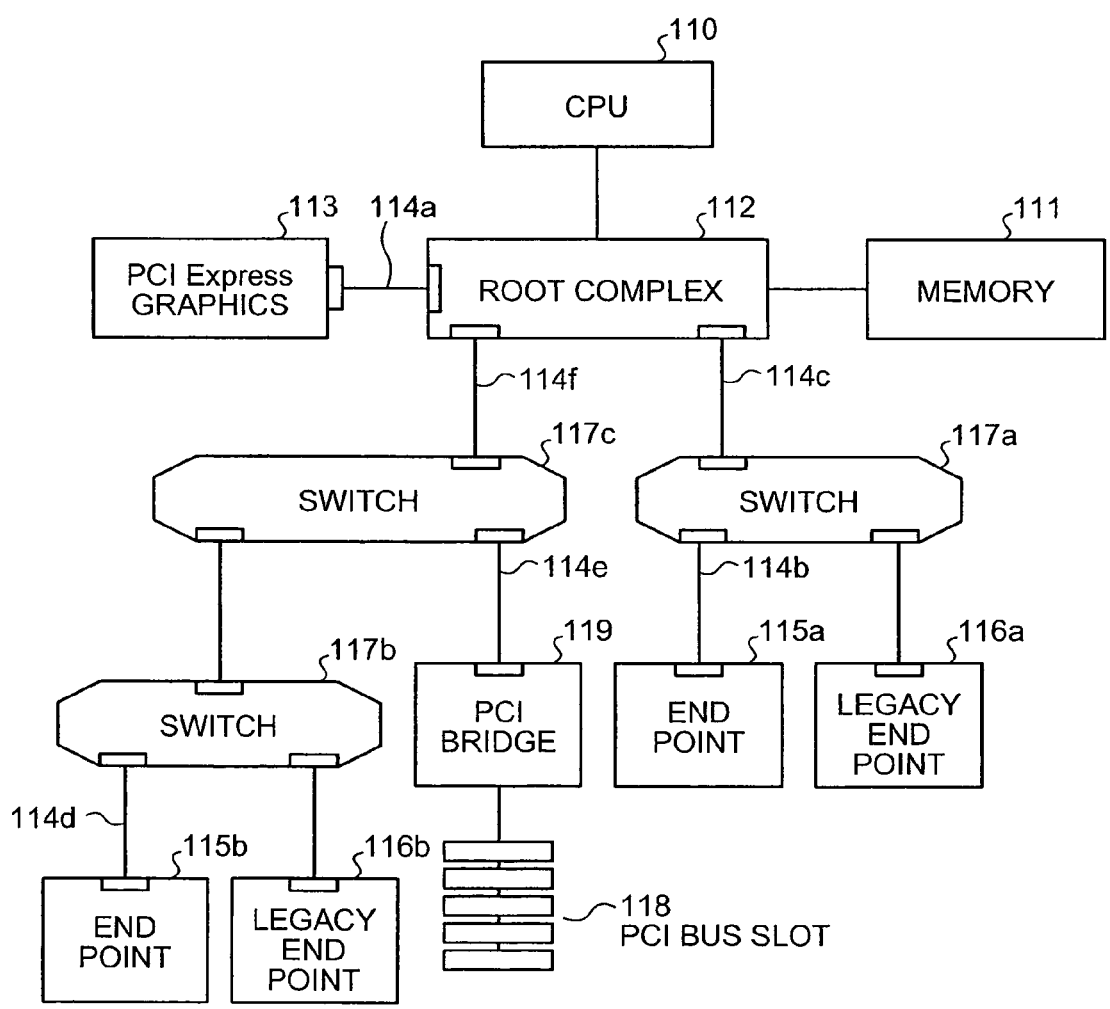
FIG. 2 is a block diagram of an example of a PCI EXPRESS system.

FIG. 1 is a block diagram of an example of a conventional PCI system, and FIG. 2 is a block diagram of an example of a PCI EXPRESS system. The PCI system has a tree structure, and includes a host bridge 103 connected to a Central Processing Unit (CPU) 100, an Accelerated Graphics Port (AGP) graphics 101, and a memory 102, PCI-X devices (upward compatible standard for PCI devices) 104a and 104b connected via a PCI-X bridge 105a to the host bridge 103, a PCI bridge 105b connected to PCI devices 104c and 104d, and a PCI bridge 107 connected to a PCI bus slot 106. The PCI bridges 105b and 107 are connected via a PCI bridge 105c to the host bridge 103.

In contrast, the PCI EXPRESS system has a tree structure, and includes a root complex 112 connected to a CPU 110 and a memory 111, a PCI EXPRESS graphics 113 connected to the root complex 112 through a PCI EXPRESS 114a, a switch 117a connected via a PCI EXPRESS 114b to an end point 115a and a legacy end point 116a, a switch 117c connected via a PCI EXPRESS 114e to a PCI bridge 119 and a switch 117b, an end point 115b and a legacy end point 116b connected via a PCI EXPRESS 114d to the switch 117b, and a PCI bus slot 118 connected to the PCI bridge 119. The switches 117a and 117c are connected via PCI EXPRESS 114c and 114f, respectively, to the root complex 112.

Figure 3:
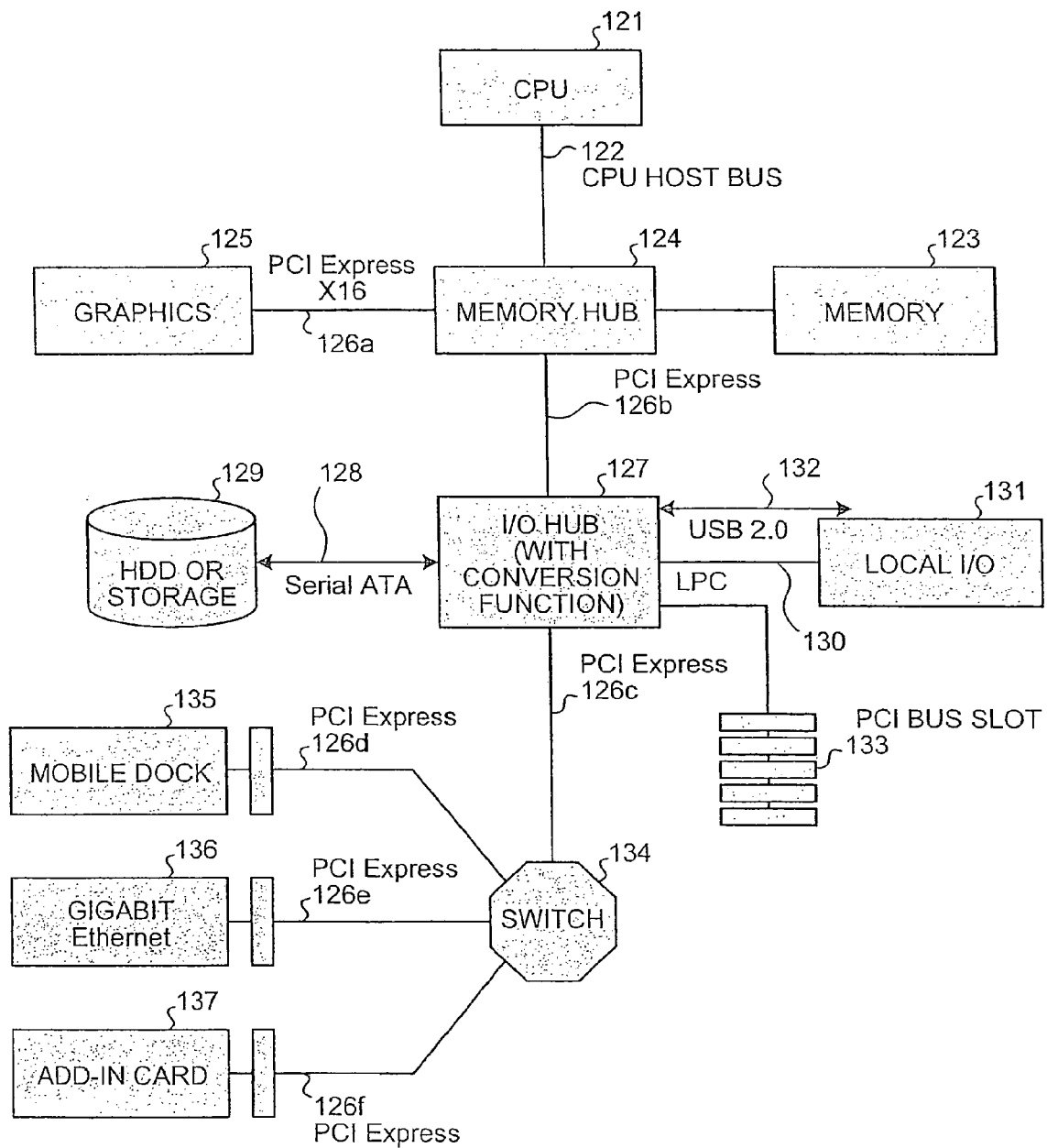
FIG. 3 is a block diagram of an example of a PCI EXPRESS platform for a desktop or a mobile computer.

FIG. 3 is a block diagram of an example of a PCI EXPRESS platform for practical use. In FIG. 3, the PCI EXPRESS is applied to a desktop or a mobile computer, and a graphics 125 is connected via a PCI EXPRESS x16 126a to a memory hub 124 (equivalent to the root complex), which is connected via a CPU host bus 122 to a CPU 121 and also to a memory 123. An input/output (I/O) hub 127 with a conversion function is also connected to the memory hub 124 via a PCI EXPRESS 126b. The I/O hub 127 is connected to a storage (or a Hard Disk Drive) 129 via a serial AT Attachment (ATA) 128, a local I/O 131 via a LPC 130, a USB 2.0 132 and a PCI bus slot 133. Further, a switch 134 is connected to the I/O hub 127 via a PCI EXPRESS 126c. A mobile dock 135, a gigabit Ethernet 136 and an add-in card 137 are connected to the switch 134 via a PCI EXPRESS 126d, 126e and 126f, respectively.

Namely, in the PCI EXPRESS system, the existing buses such as PCI, PCI-X, and AGP are replaced with the PCI EXPRESS, and bridges are used for connection of the existing PCI/PCI-X devices. The PCI EXPRESS connection is also used between chipsets. The existing buses such as IEEE1394, Serial ATA, and USB 2.0 are connected to the PCI EXPRESS via the I/O hub.

Components of PCI EXPRESS

A. Port, Lane, and Link

Figure 4:
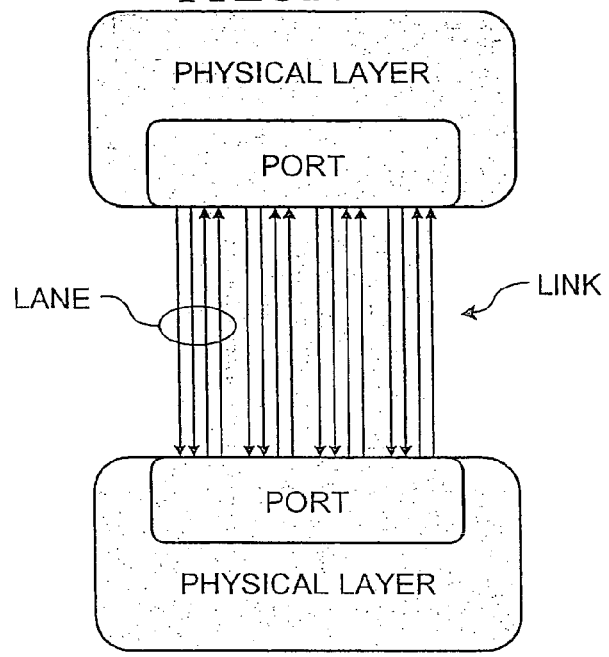
FIG. 4 is a schematic of an example of a physical layer structure with x4 links.
Figure 5:
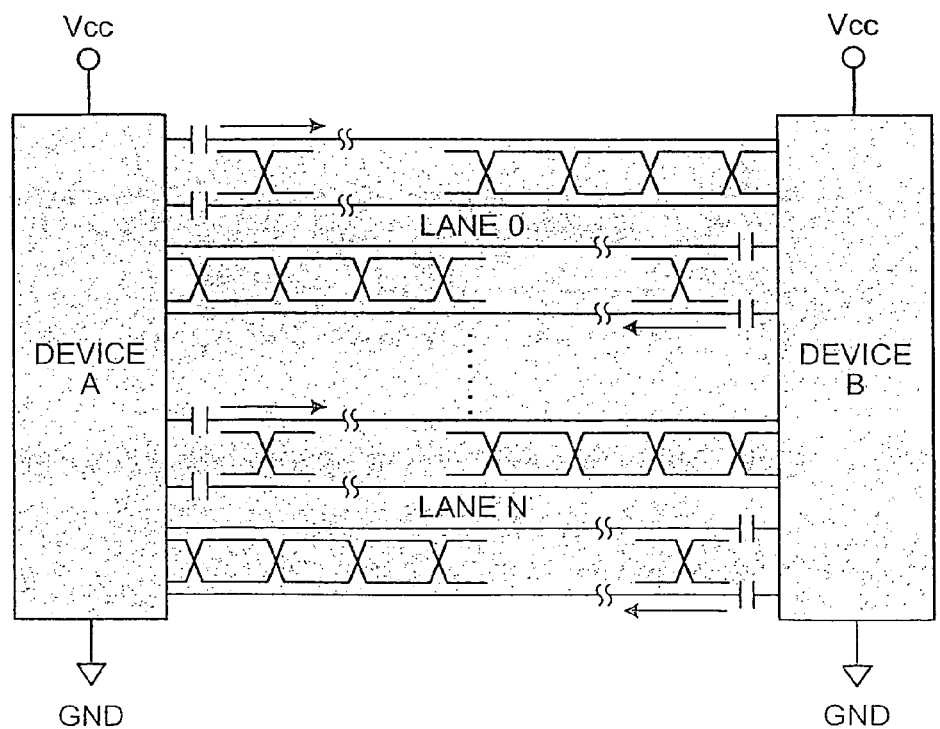
FIG. 5 is a schematic for explaining an example of lane connection between devices.

FIG. 4 is a schematic of a physical layer structure. Ports are a collection of transmitters and receivers physically present in the same semiconductor that forms a link, and logically represents an interface for point-to-point connection between a component and a link. The data transfer rate is, for example, 2.5 gigabits per second for one way. A lane consists of, for example, pairs of differential signals at 0.8 volts, including one pair of signals (two paths) for transmitting and the other pair of signals (two paths) for receiving. A link consists of two ports and a collection of lanes linking the ports. Namely, the PCI EXPRESS is a dual simplex bus. The xN link consists of N lanes, and in the current standard, there are variations of N=1, 2, 4, 8, 16, and 32. FIG. 4 depicts as an example a PCI EXPRESS x4. As shown in FIG. 5, with the variable lane width N between devices A and B, the PCI EXPRESS architecture offers scalable bandwidth.

B. Root Complex

The root complex 112 is on the top of the I/O architecture, and connects the CPU or the memory subsystem to the I/O. In the block diagrams, the root complex is usually represented as a memory hub as in FIG. 3. The root complex 112 (or the memory hub 124) has one or more PCI EXPRESS ports (root port) (indicated by rectangles in the root complex 112 in FIG. 2), and each port has a domain name for the I/O architecture. The I/O architecture domain is allocated to a simple end point (for example, the end point 115*a* in FIG. 2) or to a collection of switches and end points (the end point 115*b*, the switch 117*b*, etc.).

C. End Point

The end points 115 are devices (other than a bridge) with a type 00h configuration space header. Types of the end points are divided into a legacy end point and a PCI EXPRESS end point. The PCI EXPRESS end point differs from the legacy end point mainly in that the PCI EXPRESS end point is a base address register (BAR) not requiring I/O resources, and therefore does not make an I/O request. The PCI EXPRESS end point does not support a lock request.

D. Switch

Figure 6:
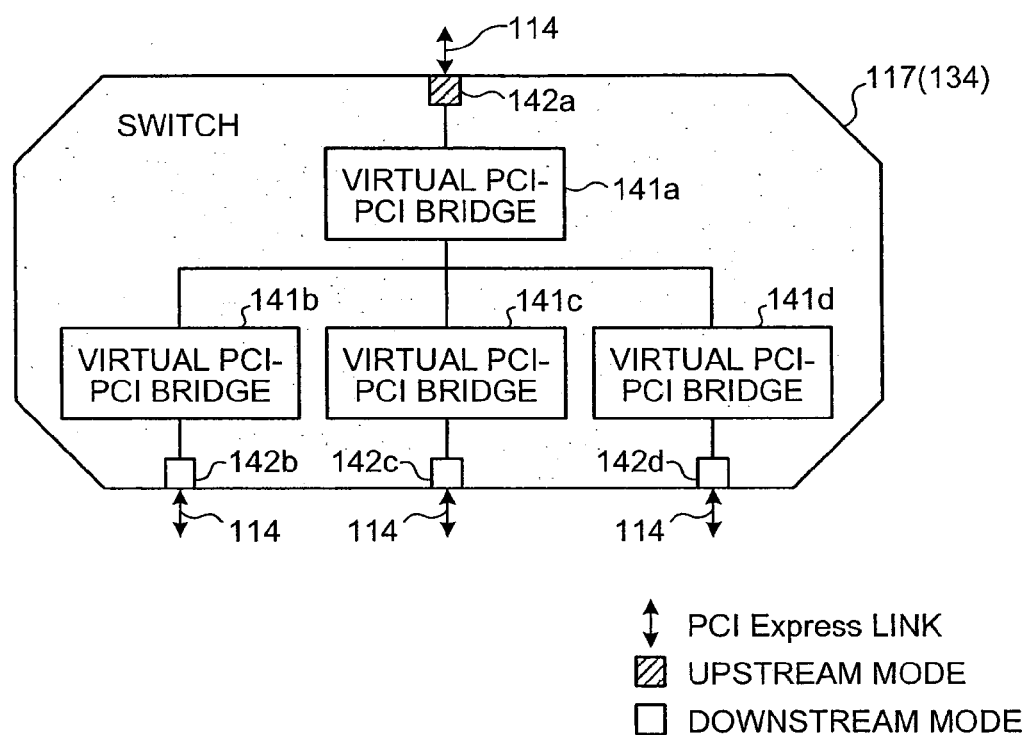
FIG. 6 is a block diagram of an example of a logical configuration of a switch.

The switch 117 (or the switch 134) connects two or more ports, and performs packet routing between the ports. As shown in FIG. 6, the switch is recognized as a collection of virtual PCI-PCI bridges 141 by configuration software. Up-and-down arrows in FIG. 6 represent the PCI EXPRESS link 114 (or the PCI EXPRESS 126), and reference numerals 142*a* to 142*d* represent ports. The port 142*a* is an upstream port close to the root complex, and the ports 142*b*, 142*c*, and 142*d* are downstream ports distant from the root complex.

E. PCI Express 114*e*—PCI Bridge 119

A PCI bridge 119 provides connection from the PCI EXPRESS to the PCI/PCI-X. With this bridge, the existing PCI/PCI-X device can be used on the PCI EXPRESS system.

Layer Architecture

Figure 7A:
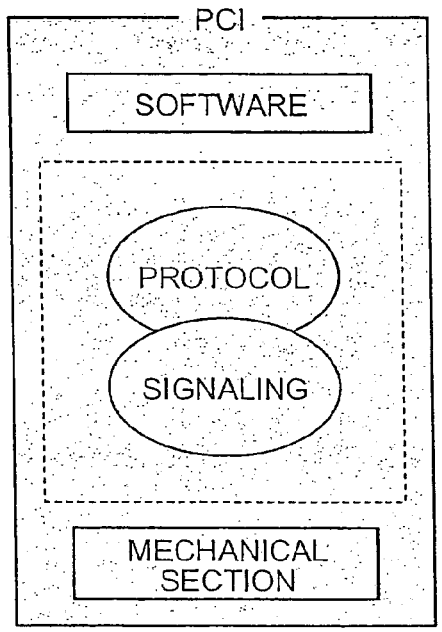
FIG. 7A is a block diagram of existing PCI architecture.
Figure 7B:
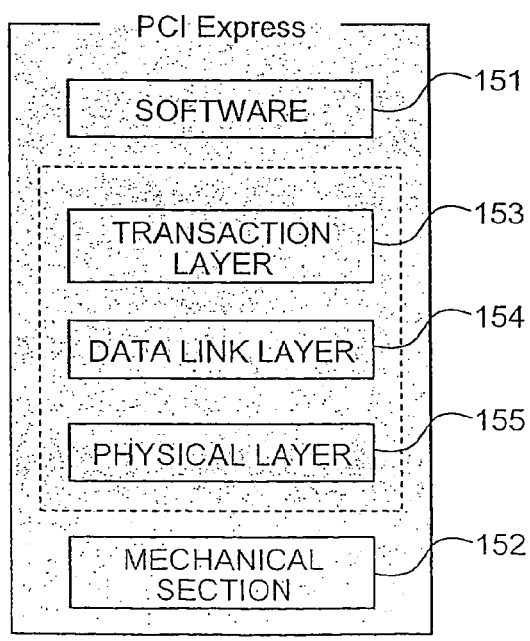
FIG. 7B is a block diagram of PCI EXPRESS architecture.

As shown in FIG. 7A, in the conventional PCI architecture, protocol and signaling are closely related to each other and there is no concept of layering. As shown in FIG. 7B, the PCI EXPRESS has a hierarchical structure as with the common communication protocol or INFINIBAND, with each layer being independent and having unique specifications. Between the top layer of software 151 and the bottom layer of a mechanical section 152, there are three layers: a transaction layer 153, a data link layer 154, and a physical layer 155 from top to bottom. Because of the structure described above, the PCI EXPRESS ensures modularity of each layer, which realizes the high scalability and reuse of the modules. For example, when a new signal coding or transmission medium is employed for the PCI EXPRESS system, it is only required to replace the physical layer, i.e., the data link layer and the transaction layer can be left unchanged.

The transaction layer 153, the data link layer 154, and the physical layer 155 are the main layers in the PCI EXPRESS architecture. Functions of the three layers are described below with reference to FIG. 8.

A. Transaction Layer 153

Figure 9:
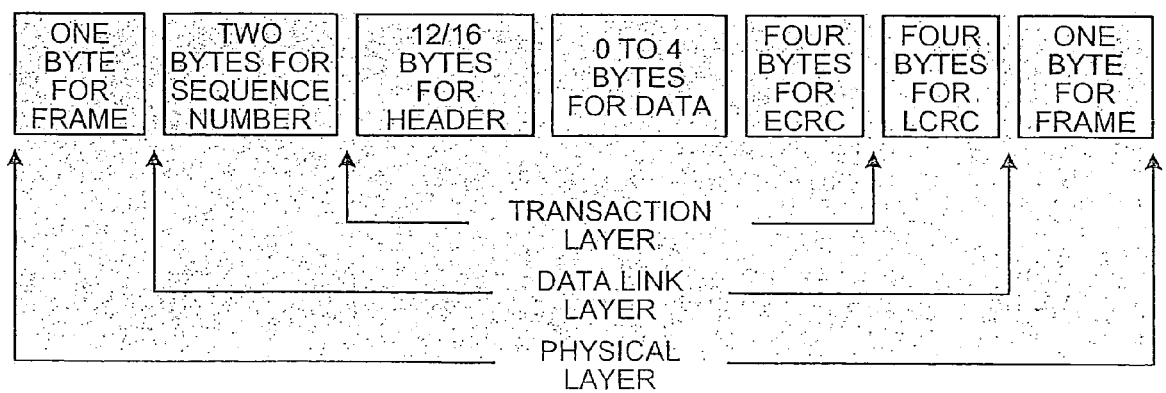
FIG. 9 is a schematic for explaining a format of a transaction layer packet.

The transaction layer 153 is an upper layer of the PCI EXPRESS architecture, and has the functions of transaction layer packet (TLP) assembly and disassembly. The TLP is used to carry transactions such as read/write and various events. The transaction layer 153 performs a flow control with a credit for the TLP. FIG. 9. illustrates an outline of the TLP in each of the layers 153 to 155. The details are described later.

B. Data Link Layer 154

Main functions of the data link layer 154 are to ensure data integrity in the TLP by detecting and correcting (retransmitting) errors, and link management. Packets are transmitted among the data link layer 154 for link management and flow control. The packet transmitted among the data link layer 154 is called data link layer packet (DLLP) so as to discriminate the packet from the TLP.

C. Physical Layer 155

The physical layer 155 includes circuits necessary for interface operation such as a driver, an input buffer, a parallel to serial/serial to parallel converter, a phase-locked loop (PLL), and an impedance matching circuit. The physical layer initializes and maintains interfaces as a logical function. The physical layer 155 also makes the data link layer 154 and the transaction layer 153 independent from the signaling technique used in the actual links.

The PCI EXPRESS employs an embedded clock for hardware configuration. In the embedded clock technique, a clock signal is not used, and a clock timing is embedded in a data signal so that a receiver extracts a clock based on a cross point of the data signal.

Configuration Space

Figure 10:
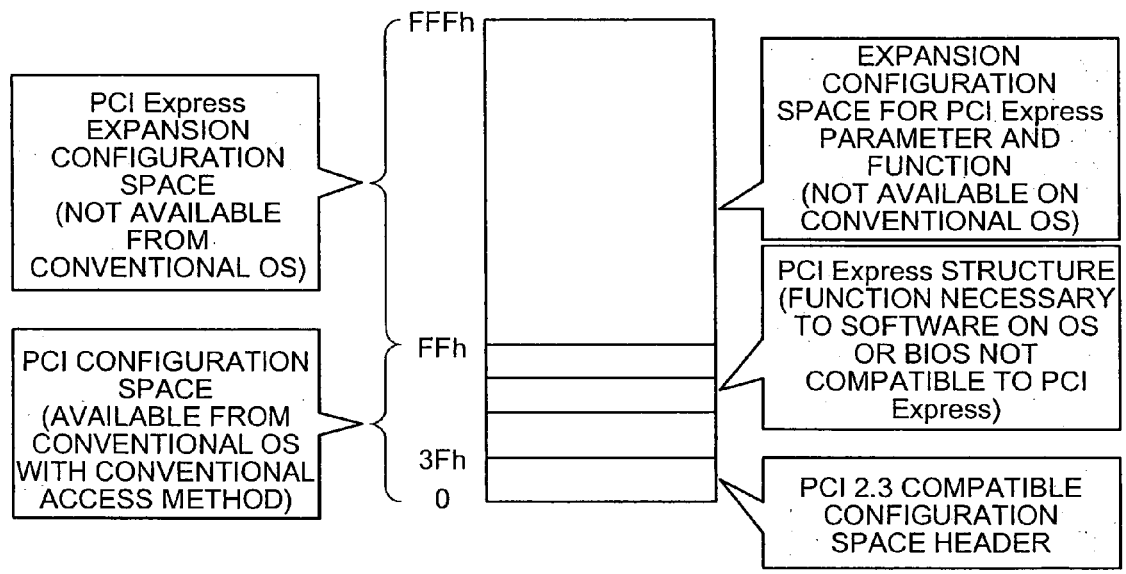
FIG. 10 is a schematic for explaining a configuration space for the PCI EXPRESS.

The PCI EXPRESS has a configuration space as in the conventional PCI. The configuration space of the conventional PCI is 256 bytes, while that of the PCI EXPRESS is expanded to 4096 bytes as shown in FIG. 10. Accordingly, the PCI EXPRESS assures a sufficient space for devices requiring a large number of unique register sets such as a host bridge to be used. Access to the configuration space is performed as access to a flat memory space (configuration read/write), and a bus, a device, a function, and a register number are mapped on the memory address.

A header, 256 bytes, of the configuration space can be accessed as a PCI configuration space from a basic input/output system (BIOS) or a conventional operating system (OS) via an I/O port. A function for converting conventional access to PCI EXPRESS access is implemented on the host bridge. From type 00h to 3Fh a configuration space header is compatible with the PCI 2.3. Because of the feature, the conventional OS or software can be used without modifications except for functions extended with the PCI EXPRESS. That is, the software layer of the PCI EXPRESS succeeds the load/store architecture (an architecture in which a processor directly accesses an I/O register) that compatibility with the existing PCI. To use the functions extended with the PCI EXPRESS (for example, synchronized transmission and Reliability, Availability and Serviceability (RAS) functions), it is required to access PCI EXPRESS space extended by 4 kilobytes.

There are various form factors for the PCI EXPRESS, such as an add-in card, a plug-in card, and Mini PCI EXPRESS.

Details of PCI EXPRESS Architecture

The transaction layer 153, the data link layer 154, and the physical layer 155, which are the main part of the PCI EXPRESS architecture, are described in detail below.

A. Transaction Layer 153

As described above, the main function of the transaction layer 153 is to assemble and disassemble the TLP between the upper layer of the software 151 and the lower layer of the data link layer 154.

a. Address Space and Transaction Type

Four address spaces are defined in the PCI EXPRESS. Specifically, in addition to three spaces having been supported in the conventional PCI: a memory space (a space for data transmission between memory spaces), an I/O space (a space for data transmission between I/O spaces), and a configuration space (a space for device configurations and set-ups), a message space (a space for in-band notification of events or general message transmission (exchange) between PCI EXPRESS devices. A request for interruption or confirmation is delivered by using the message as a virtual wire. A specific transaction type is defined for each space. That is, each of the memory space, the I/O space, and the configuration space is read/write, and the message space is basic (including vendor definitions).

b. Transaction Layer Packet (TLP)

The PCI EXPRESS performs communication packet by packet. In the TLP format shown in FIG. 9, a header is 3 double words long (12 bytes in total) or 4 double words (16 bytes), containing information such as a format of the TLP (the header length and presence of a payload), a transaction type, a traffic class (TC), an attribute, and a payload length. The maximum length of the payload in a packet is 1024 double words (4096 bytes).

The End-to-end Cyclic Redundancy Check (ECRC) is a cyclic redundancy check (CRC) of 32 bits, a part of the TLP, and ensures end-to-end data integrity. The ECRC is calculated because, when an error occurs in the TLP, for example, within a switch, the Link-CRC (LCRC) cannot detect such error (the LCRC is recalculated based on the error TLP).

A complete packet is required in some requests, but is not required in other requests.

c. Traffic Class (TC) and Virtual Channel (VC)

Upper software can differentially treat traffics (set priority of traffics) by setting a traffic class (TC). With this function, for example, the software transfers image data before network data. There are eight classes from TC0 to TC7 in the TC.

Figure 11:
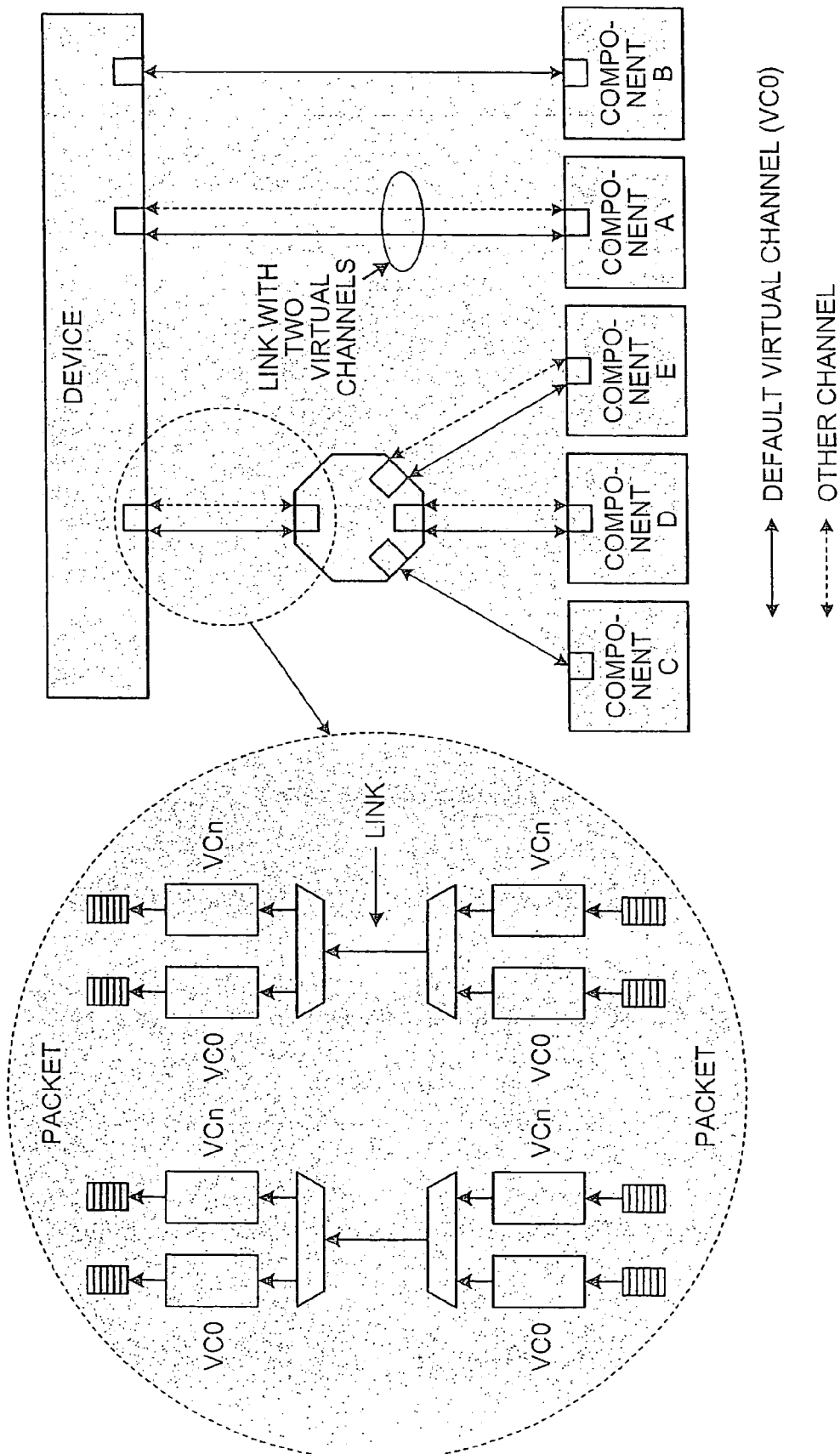
FIG. 11 is a schematic for explaining a concept of a virtual channel.

A virtual channel (VC) is an independent virtual-communication bus (employing a mechanism using a plurality of independent data-flow buffers that share the same link). Each VC has resources (such as a buffer and a queue), and independently performs a flow control as shown in FIG. 11. With the mechanism, even when a buffer of a VC is full, data can be transferred over another VC. That is, one link, in a physical sense, is divided into a plurality of VCs, and can be used effectively. For example, as shown in FIG. 11, when a path branches via a switch to link to a plurality of devices, the PCI EXPRESS can control priority of traffics to each device. A VC 0 is an essential one, and the other VCs (VC 1 to VC 7) are implemented based on cost-performance tradeoff. Solid arrows indicate default VCs (VC 0), and dotted arrows indicates the other VCs (VC 1 to VC 7).

In the transaction layer, a TC is mapped on a VC. When the number of VCs is small, one or more TCs can be mapped on one VC. In a simple example, one TC can be mapped on one VC in one-to-one fashion, or all TCs can be mapped on one VC 0. Mapping of TC 0 on VC 0 is essential and fundamental, while mapping of other TCs is controlled by the upper software. The software can control priority of transactions using the TC.

d. Flow Control

Flow control is necessary to avoid overflow in a receive buffer and to establish a transmission order. The flow control is performed between links not in an end-to-end manner, but in a point-to-point manner. Therefore, the arrival of a packet at destination (completer) cannot be confirmed by the flow control.

Flow control in the PCI EXPRESS is performed on credit basis (before initiation of data transfer, the available space of a receiver's buffer is checked to avoid overflow or underflow). Specifically, the receiver notifies the sender of a buffer capacity (credit value) when a link is initialized. The sender compares the length of a packet to be sent with the credit value. Only when remaining space in the buffer is sufficient for the packet, the sender sends the packet to the receiver. There are six types of the credit.

Information for the flow control is exchanged by the DLLP in the data link layer. The flow control is applied only to the TLP and not to the DLLP (the DLLP can be transmitted and received all the time).

B. Data Link Layer 154

As described above, a main role of the data link layer is to provide a highly reliable function of exchanging TLPs between two components on a link.

a. Handling of Transaction Layer Packet (TLP)

Having received a TLP from the transaction layer 153, the data link layer 154 attaches a 2-byte sequence number to the head of the TLP and a 4-byte LCRC to the tail, and sends the TLP to the physical layer 155 (refer to FIG. 9). The TLP is stored in a retry buffer and is retransmitted until an acknowledgement (ACK) is received. When a transmission failure of the TLP continues, the data-link layer determines that the link is defective, and requires the physical layer 155 to retrain the link. When the retraining of the link fails, the data link layer 154 becomes inactive.

The TLP received from the physical layer 155 is checked for the sequence number and the LCRC. When the TLP is valid and error-free, the TLP is sent to the transaction layer 153. When the TLP has an error, the data link layer 154 requests the physical layer 155 for retransmission.

b. Data Link Layer Packet (DLLP)

Figure 12:
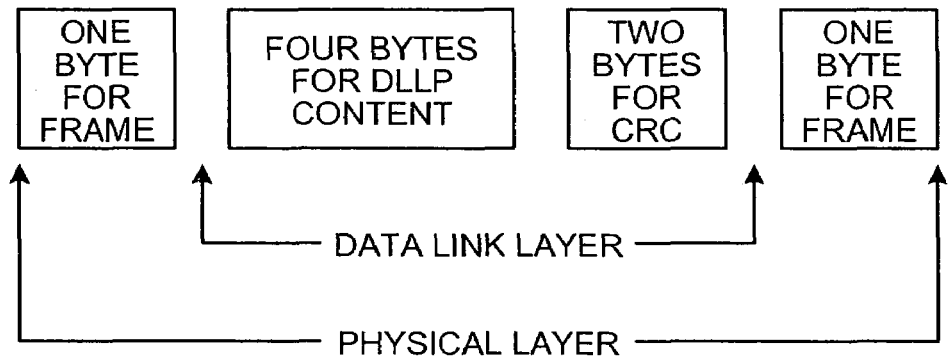
FIG. 12 is a schematic for explaining a format of a data link layer packet.

TLP is automatically split into DLLPs as shown in FIG. 12 to be sent to each lane from the physical layer 155. A packet generated in the data link layer 154 is called data link layer packet (DLLP) and is exchanged in the data link layer 154. There are three types of DLLP as follows:

ACK/Nak: acknowledgement of TLP, retry (retransmission)

InitFC1/InitFC2/UpdateFC: initializing and updating of flow control

DLLP for power management

As shown in FIG. 12, the DLLP is 6-byte long, and is composed of a DLLP type (one byte), information unique to the DLLP type (three bytes), and CRC (two bytes).

C. Physical Layer—Logical Sub-block 156

Figure 8:
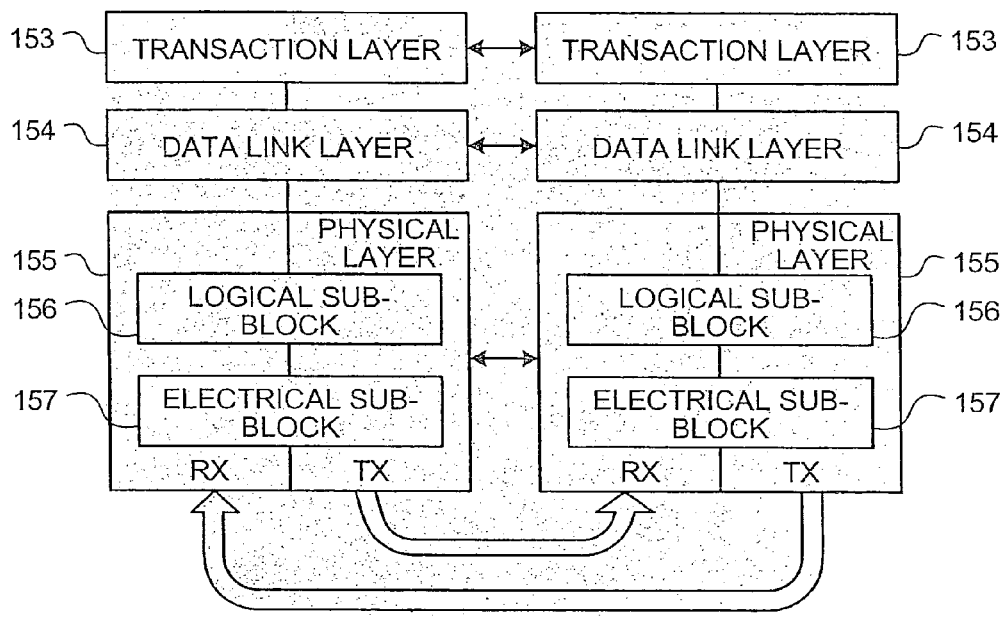
FIG. 8 is a block diagram of a hierarchical structure of PCI EXPRESS.

A main function of a logical sub-block 156 in the physical layer 155 shown in FIG. 8 is to convert a packet received from the data link layer 154 into a specific format so that an electrical sub-block 157 can transmit the packet. The logical sub-block 156 also controls and manages the physical layer 155.

a. Data Coding and Parallel-to-Serial Conversion

The PCI EXPRESS employs 8B/10B conversion in data coding to avoid a series of 0s or 1s (i.e., to make a cross-point occur within a prespecified period). As shown in FIG. 13, coded data is converted into serial data, and is sent from the logical sub-block on the lane. When there is a plurality of lanes (FIG. 13 depicts the PCI EXPRESS x4 links), the data is allocated on each lane in unit of byte before coding. PCI EXPRESS replaces a parallel bus with a series of serial buses. That is, because the data is transferred independently in each lane, the problem of skew in parallel buses can be effectively reduced.

b. Power Management and Link States

To suppress power consumption of a link, four link states: L0, L0s, L1, and L, are defined as shown in FIG. 14.

L0 represents a normal mode, and the power consumption becomes less from L0s to L2, but a longer time is required to return to L0. As shown in FIG. 15, in addition to power management by software, active state power management enables further power reduction.

D. Physical Layer—Electrical Sub-block 157

The main function of the electrical sub-block 157 in the physical layer is to send data serialized by the logical sub-block 156 on a lane, and to receive data from a lane to send the data to the logical sub-block 156.

a. Alternating Current (AC) Coupling

A sender in a link is installed with an alternating current (AC) coupling capacitor so that a direct current (DC) common mode voltage at the sender can be different from that at a receiver. Because of the feature, the sender can employ a design, a semi-conductor process, and a power supply voltage different from those at the receiver.

b. De-Emphasis

As described above, the PCI EXPRESS uses 8B/10B encoding to avoid a series of 0s and 1s as possible. However, 8B/10B encoding may allow up to five successive 0s or 1s. In this case, the sender is required to transfer de-emphasized data. De-emphasis means lowering a differential voltage level (voltage amplitude) from the second bit by 3.5±0.5 decibels to ensure a signal noise margin for the receiver when data contains consecutive bits with the same polarity. Due to attenuation dependent on a frequency of a transmission path, when bits of a signal change, the signal contains many high-frequency components, and a waveform thereof is small on the receiver side. On the other hand, when bits do not change, the signal contains few high-frequency components, and the waveform is relatively large on the receiver side. De-emphasis is performed to keep the waveform constant.

Information Processing System

An information processing system according to an embodiment of the present invention is applied to a digital copy machine, an MFP, or the like, and employs a high-speed serial bus compliant with the PCI EXPRESS standard described above as the internal interface.

Figure 16:
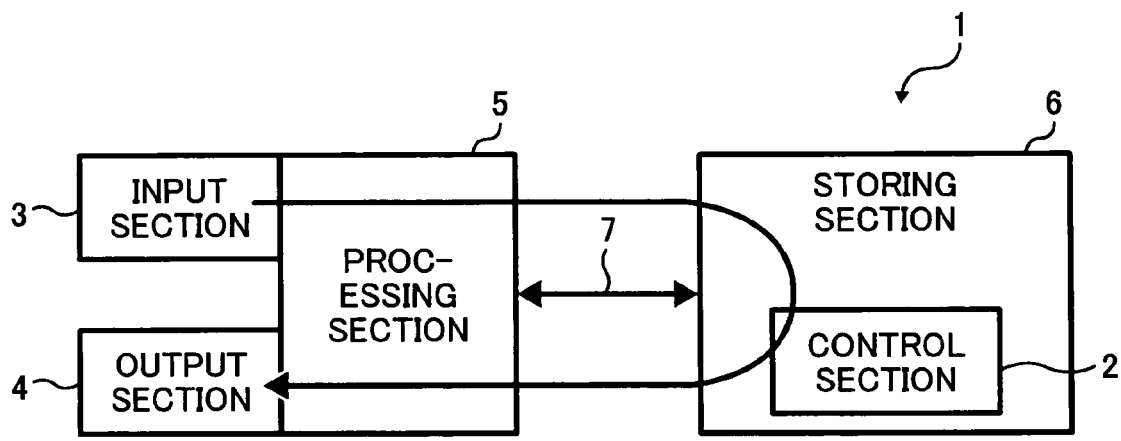
FIG. 16 is a schematic of an information processing system according to a first embodiment of the present invention.

FIG. 16 is a schematic of an information processing system 1 according to a first embodiment of the present invention. The information processing system 1 includes a control section 2, an input section 3 for inputting an image, an output section 4 for outputting the image, a processing section 5 for processing the image, and a storing section 6. The control section 2 includes a CPU or the like that controls the entire system according to a program (software) installed therein, and is a printer controller to, for example, control paths, and make a determination on a path. The input section 3 receives data such as image data as input, and is formed of a scanner engine, etc. for optically reading an original image to obtain image data. The output section 4 prints or outputs the image data on a printing medium such as printing paper, and is formed of an electrophotographic plotter (printer) engine or the like. The processing section 5 performs image processing such as zooming and turning. For example, the processing section 5 includes a zooming unit, a turning unit, and a compressing/decompressing unit. The storing section 6, including a memory, a HDD, etc., stores image data. In the first embodiment, for example, the printer controller functions as the storing section 6.

In the information processing system (MFP) 1 of the first embodiment, the processing section 5 is integrated with the input section 3 and the output section 4, the storing section 6 (printer controller) includes the control section 2, and the processing section 5 is connected to the storing section 6 via a high-speed serial bus 7 to compliant with the PCI EXPRESS standard (i.e., the processing section 5 and the storing section 6 has a port).

With the configuration, under the control of the control section 2, image data input through the input section 3 is subjected to image processing by the processing section 5 as required. The image data is sent to the storing section 6 via the high-speed serial bus 7, and then temporarily stored in a memory of the storing section 6. Stored image data is sent to the processing section 5 via the high-speed serial bus 7, and undergoes image processing as required. After that, the image data is sent to the output section 4 to be printed out.

In the information processing system 1, the processing section 5 is connected to the storing section 6 via the high-speed serial bus 7 compliant with the PCI EXPRESS standard. Consequently, electronic components can be mounted on a different board for the processing section 5 and the storing section 6. This enhances the freedom of design, and reduces costs because the less board area is required, without any loss in high speed performance.

The configuration of the first embodiment shown in FIG. 16 is an example only, and can be modified or changed as desired for various applications.

Figure 17:
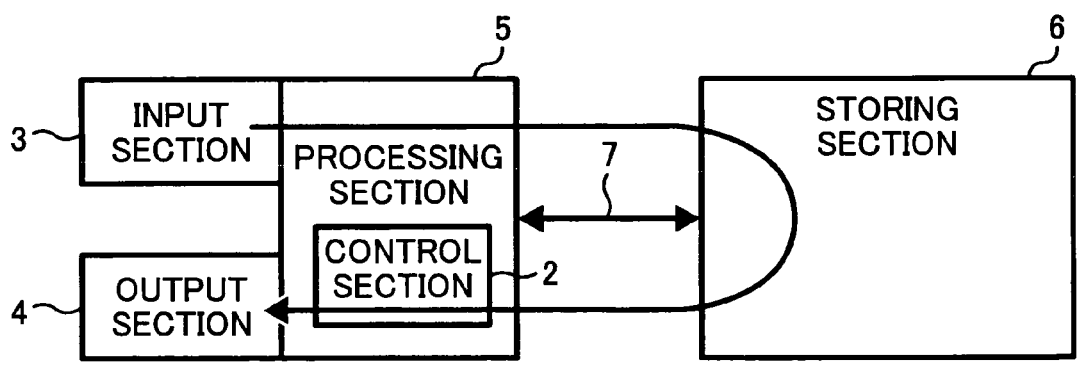
FIG. 17 is a schematic of a modification of the information processing system shown in FIG. 1.

FIG. 17 is a schematic of a modification of the information processing system 1, in which the control section 2 is arranged in the processing section 5.

Figure 18:
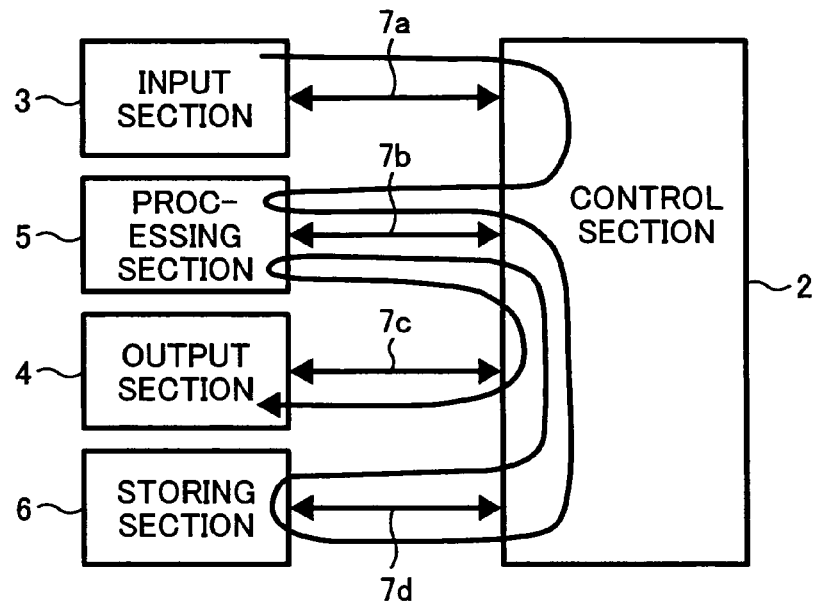
FIG. 18 is a schematic of another modification of the information processing system.

FIG. 18 is a schematic of yet another modification of the information processing system 1, in which each of the input section 3, the processing section 5, the output section 4, and the storing section 6 is connected to the control section 2 via high-speed serial buses 7a to 7d. With this configuration, the control section 2 is independent and equivalently handles the input section 3, the processing section 5, the output section 4, and the storing section 6. The control section 2 in this case can be easily implemented with a root complex, which is located at the root of the PCI EXPRESS tree structure.

Thus, image data input through the input section 3 is sent to the control section 2 via the high-speed serial bus 7a, and sent to the processing section 5 via the high-speed serial bus 7b to be subjected to necessary image processing. Then, the image data is sent to the storing section 6 via the high-speed serial buses 7b and 7d to be temporally stored in the memory. In parallel with this operation, image data present in the memory of the storing section 6 can be sent to the processing section 5 via the high-speed serial buses 7b and 7d to be subjected to necessary image processing, and then sent to the output section 4 via the high-speed serial buses 7b and 7d to be printed out.

Figure 19:
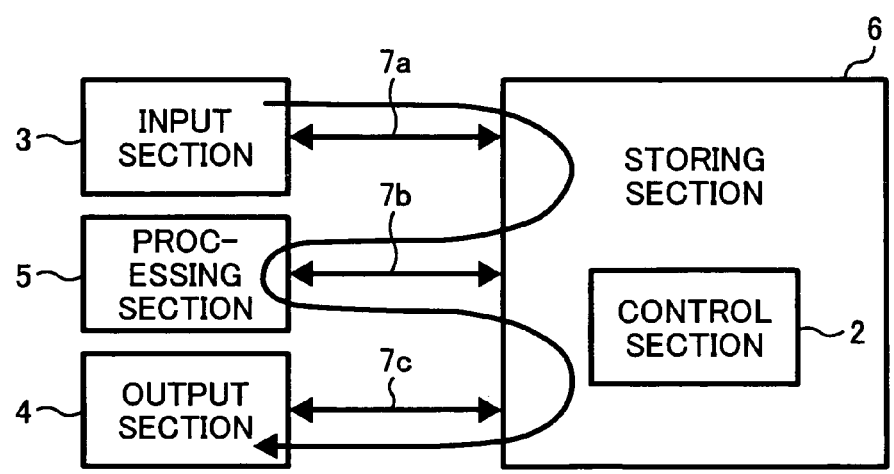
FIG. 19 is a schematic of yet another modification of the information processing system.

FIG. 19 depicts another configuration in which each of the input section 3, the processing section 5, and the output section 4 is connected to the storing section 6 including the control section 2 via the high-speed serial buses 7a to 7c. With this configuration, the storing section 6 equivalently handles the input section 3, the processing section 5, and the output section 4. As in the case of FIG. 18, the control section 2 of FIG. 19 can be implemented with the root complex, which is located at the root of the PCI EXPRESS.

Thus, for example, image data input through the input section 3 is sent to the storing section 6 via the high-speed serial bus 7a, and sent to the processing section 5 via the high-speed serial bus 7b to be subjected to necessary image processing. Then, the image data is sent to the storing section 6 via the high-speed serial bus 7b to be temporarily stored in the memory. At the same time, image data present in the memory of the storing section 6 can be sent to the output section 4 via the high-speed serial bus 7c to be printed out.

Figure 20:
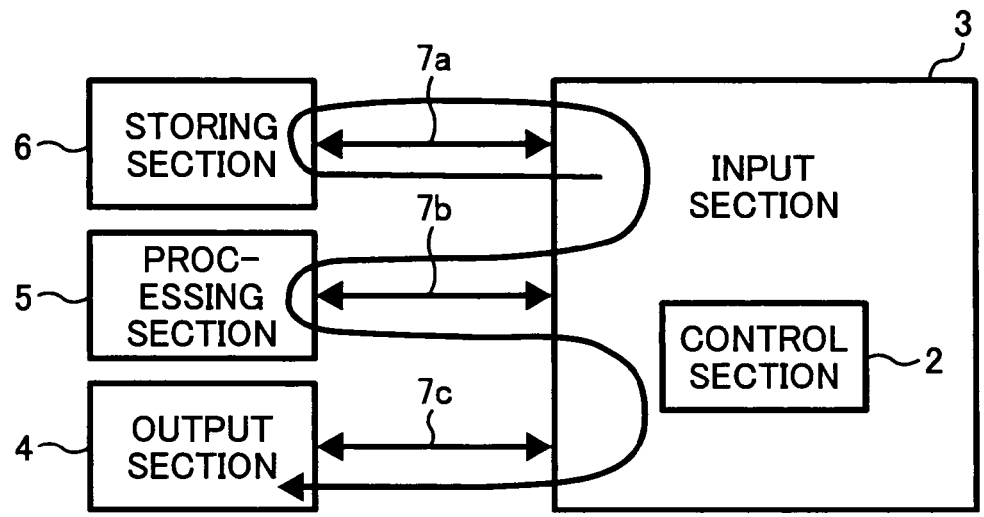
FIG. 20 is a schematic of yet another modification of the information processing system.
Figure 21:
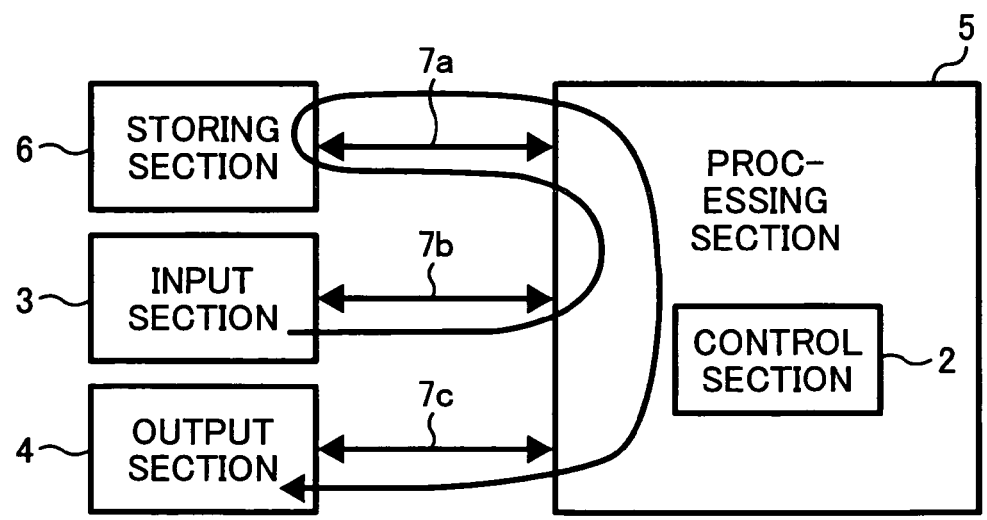
FIG. 21 is a schematic of yet another modification of the information processing system.
Figure 22:
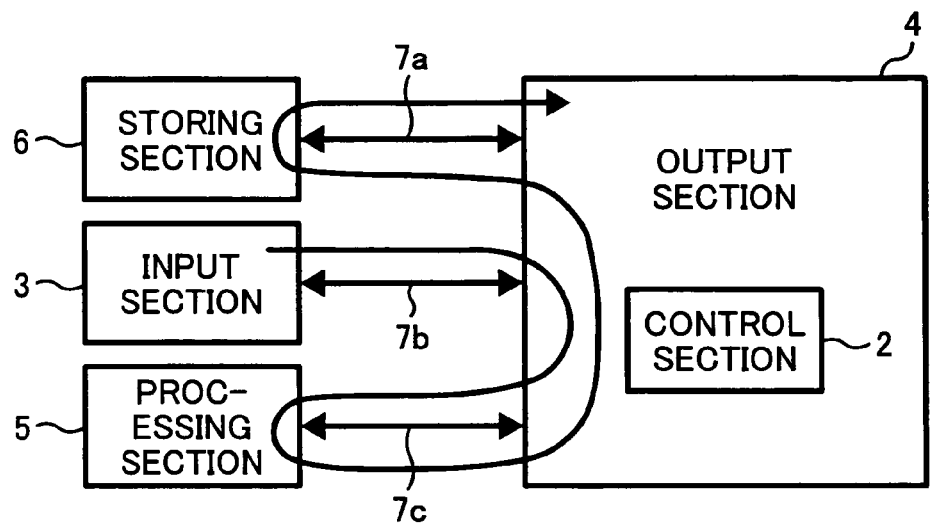
FIG. 22 is a schematic of yet another modification of the information processing system.

FIG. 20 depicts a modification of the configuration shown in FIG. 19, in which the input section 3 and the storing section 6 are replaced with each other. FIG. 21 depicts another modification of the configuration shown in FIG. 19, in which the processing section 5 and the storing section 6 are replaced with each other. FIG. 22 depicts yet another modification of the configuration shown in FIG. 19, in which the output section 4 and the storing section 6 are replaced with each other.

Figure 23:
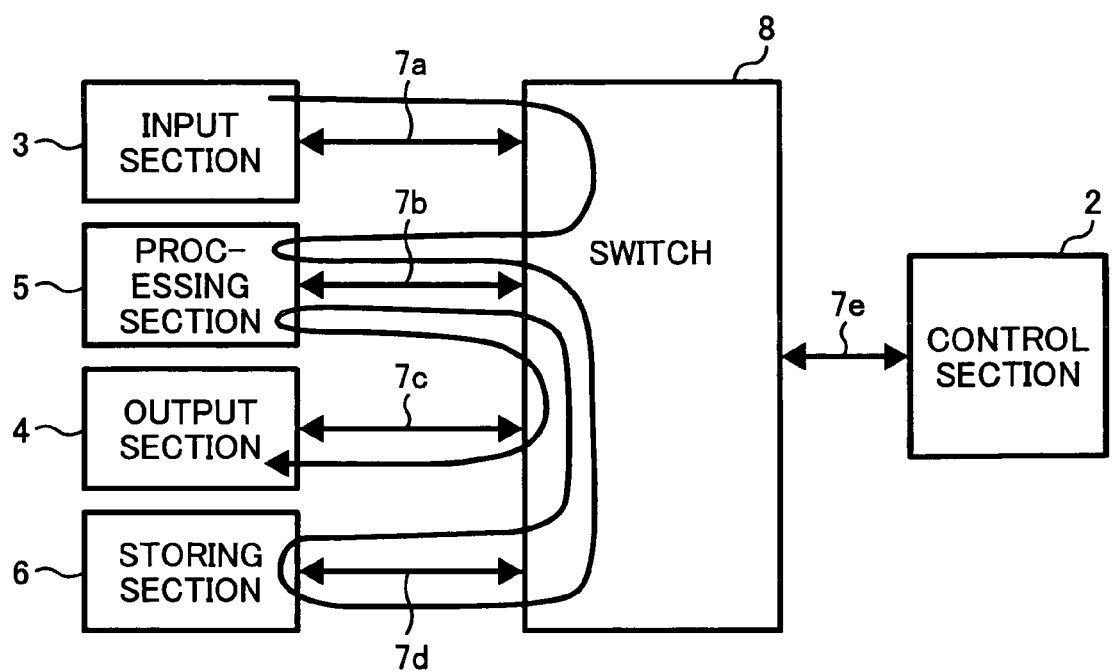
FIG. 23 is a schematic of yet another modification of the information processing system.
Figure 24:
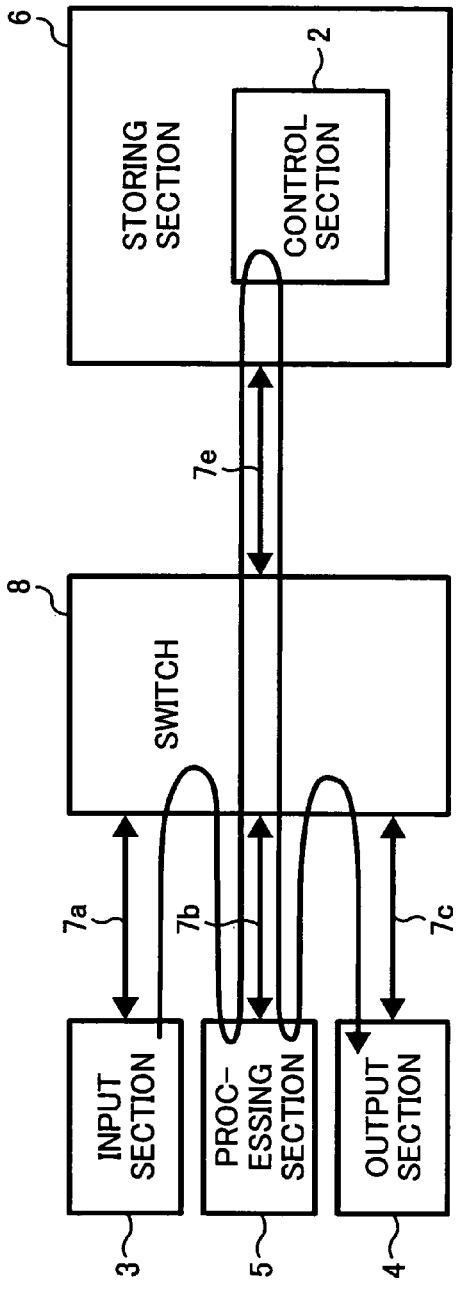
FIG. 24 is a schematic of yet another modification of the information processing system.
Figure 25:
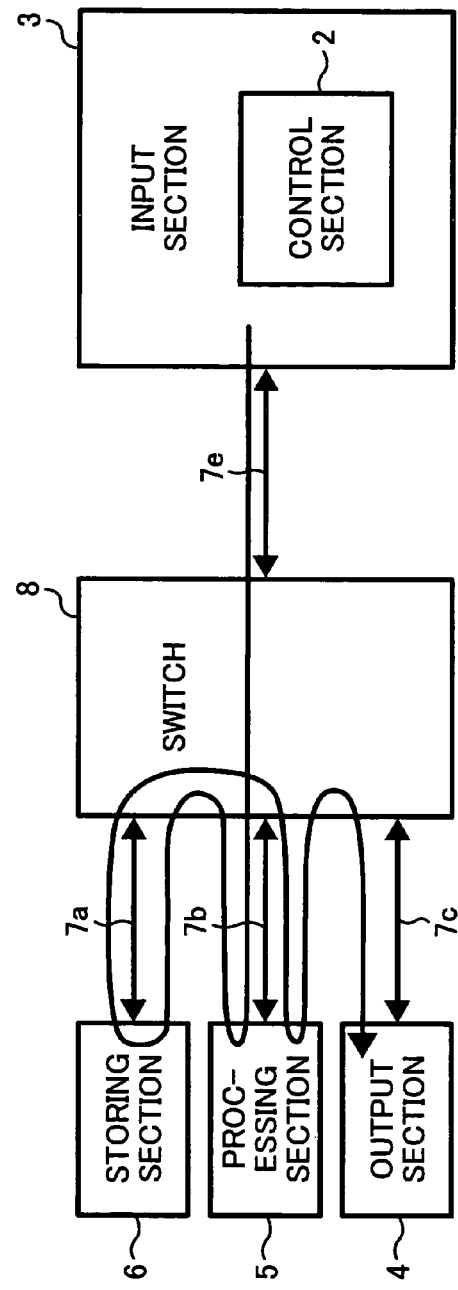
FIG. 25 is a schematic of yet another modification of the information processing system.
Figure 26:
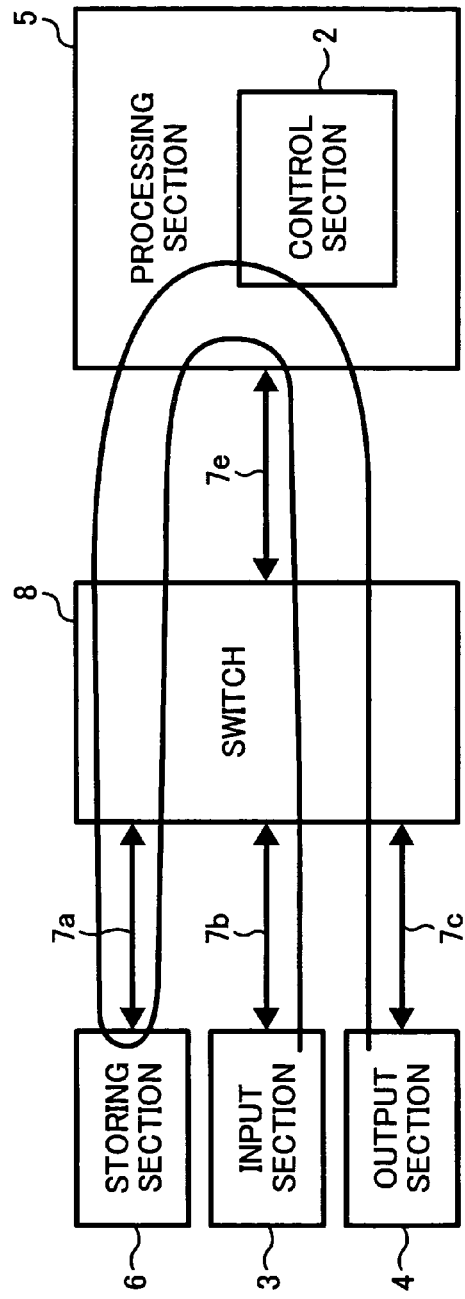
FIG. 26 is a schematic of yet another modification of the information processing system.
Figure 27:
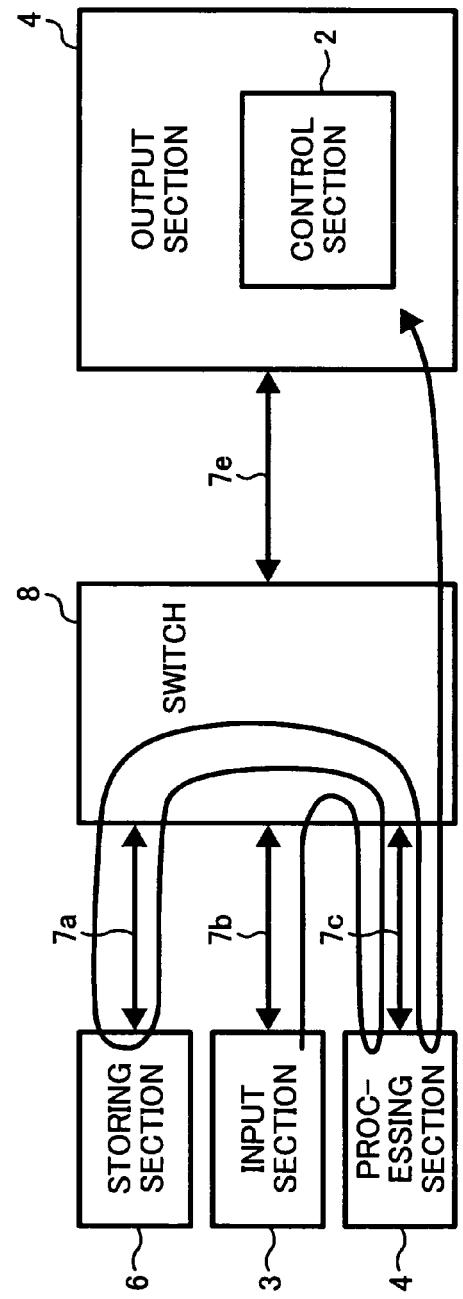
FIG. 27 is a schematic of yet another modification of the information processing system.

FIG. 23 depicts yet another configuration based on that of FIG. 18, further including a switch 8 in the tree structure of the PCI EXPRESS system. The switch 8 is located in the downstream side from the control section 2, and connected to the control section 2 via the high-speed serial bus 7e. The input section 3, the processing section 5, the output section 4, and the storing section 6 are connected to downstream side ports of the switch 8 via the high-speed serial buses 7a to 7d, respectively FIGS. 24 to 27 depict modifications of the configurations shown in FIGS. 19 to 22, respectively, which includes the switch 8 in the tree structure of the PCI EXPRESS system.

An optimal configuration of the information processing system is described below with reference to FIG. 28. The configuration includes the switch 8 in the tree structure of the PCI EXPRESS system in a path of the high-speed serial bus compliant with the PCI EXPRESS standard to achieve high-scalability and high-speed performance at the same time. This configuration is not for a stand-alone information processing system like the MFP described above, but for an information processing system formed of a plurality of devices connected to each other. Basically, a plotter (or a printer) 11 functioning as the output section is connected to image memories 12 and 13 corresponding to the storing section with high-speed serial buses 14a, 14b, and 14c and via a single-step switch 15 compliant with the PCI EXPRESS standard. As the image memories 12 and 13, a dedicated memory is used which stores final dot data to be printed by the plotter 11. When a real-time compressing/decompressing unit is present in the path, the memory can store compressed data instead of the final dot data. In addition, a root complex 18 functioning as the control section, which is connected to a CPU 16 and a system memory 17, is located upstream of the switch 15 and connected thereto via a high-speed serial bus 14d based on the PCI EXPRESS standard. A scanner 19 functioning as the input section and an image-processing computing unit 20 functioning as the processing section, with no timing constraint and high-speed performance requirement, are located downstream of the switch 15 and connected thereto through an extended switch 21 based on the PCI EXPRESS standard via high-speed serial buses 14e, 14f and 14g. The scalability of the switch 15 enables extension of the system. Additionally, because the switch 15 connects the plotter 11 to the image memories 12 and 13 with a short distance, which require strict timing control at high-speed processing to, for example, transfer data in synchronism with a line synchronization signal, delay of the data transfer is reduced and a high-speed data transfer from the image memory 12 or 13 to the plotter 11 can be realized.

In the information processing system, the same interface is shared, and, as with the plotter 11, an MFP 22 having a scanner and a plotter is connected to the switch 15 via a high-speed serial bus 14h based on the PCI EXPRESS standard. The plotter of the MFP 22 is also connected to the image memories 12 and 13 via the single-step switch 15 with a short distance. Therefore, data can be transferred from the image memory 12 or 13 to the plotter in synchronism with a line synchronization signal without any delay.

The data transfer is described in details below. In FIGS. 16, 17, 19, 23, and 27 in which data can be directly transferred from the storing section 6 to the output section 4, data is basically transferred in a way that data is transferred from the input section 3 to the storing section 6 via the high-speed serial bus 7 in synchronism with the line synchronization signal, and the data is transferred from the storing section 6 to the output section 4 in synchronism with the line synchronization signal. In this case, it is preferable that the data transfer from the storing section 6 to the output section 4 be performed prior to the data transfer from the input section 3 to the storing section 6.

More specifically, the input section 3 and the output section 4 function as initiators of data transfer with the input section 3 handling a memory write transaction and the output section 4 handling a memory read transaction. A different TC is allocated to each type of the transactions, respectively. In setting a VC, priority of the TC assigned to the memory read transaction of the output section 4 is set higher than that of the TC assigned to the memory write transaction of the input section 3, and strict priority is set so that the memory write transaction is issued after all of the memory read transactions are issued. As a result, the data can be output at a high speed even when line synchronous transfer is restricted by timing constraint, and a plurality of data can be transferred at the same time.

Figure 29A:
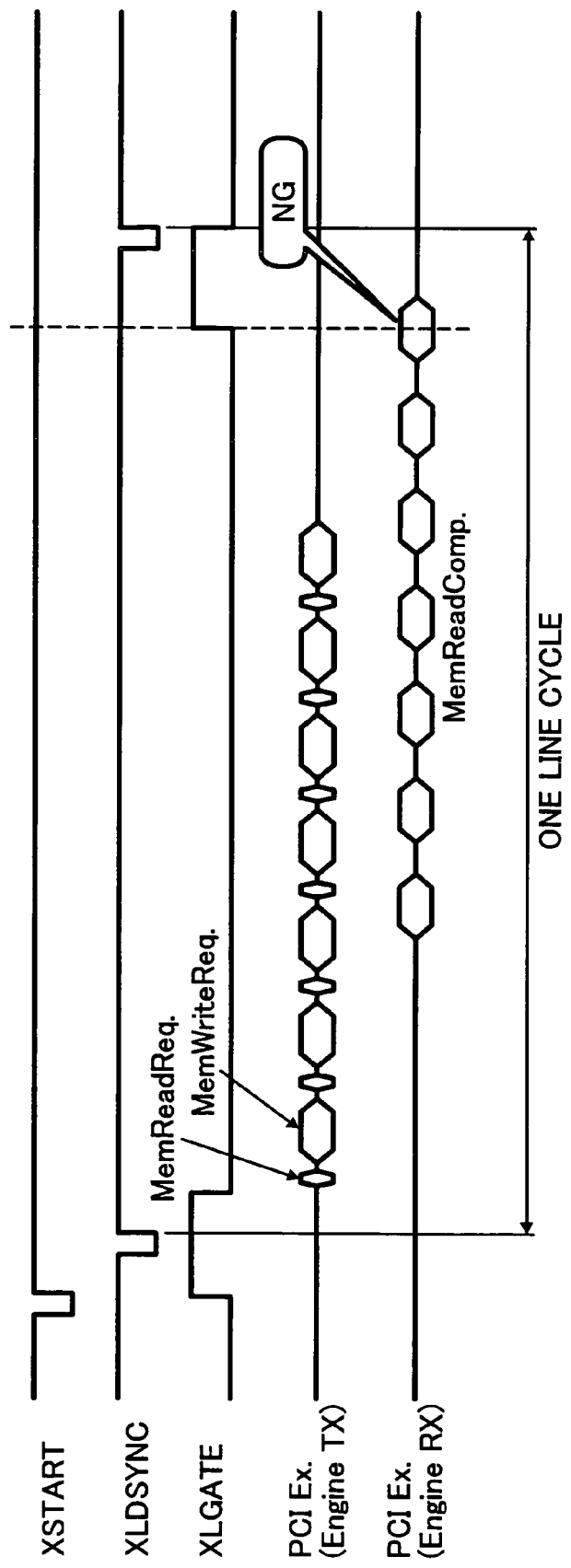
FIGS. 29A and 29B are timing charts for explaining the order in which commands are issued according to a conventional technology.
Figure 29B:
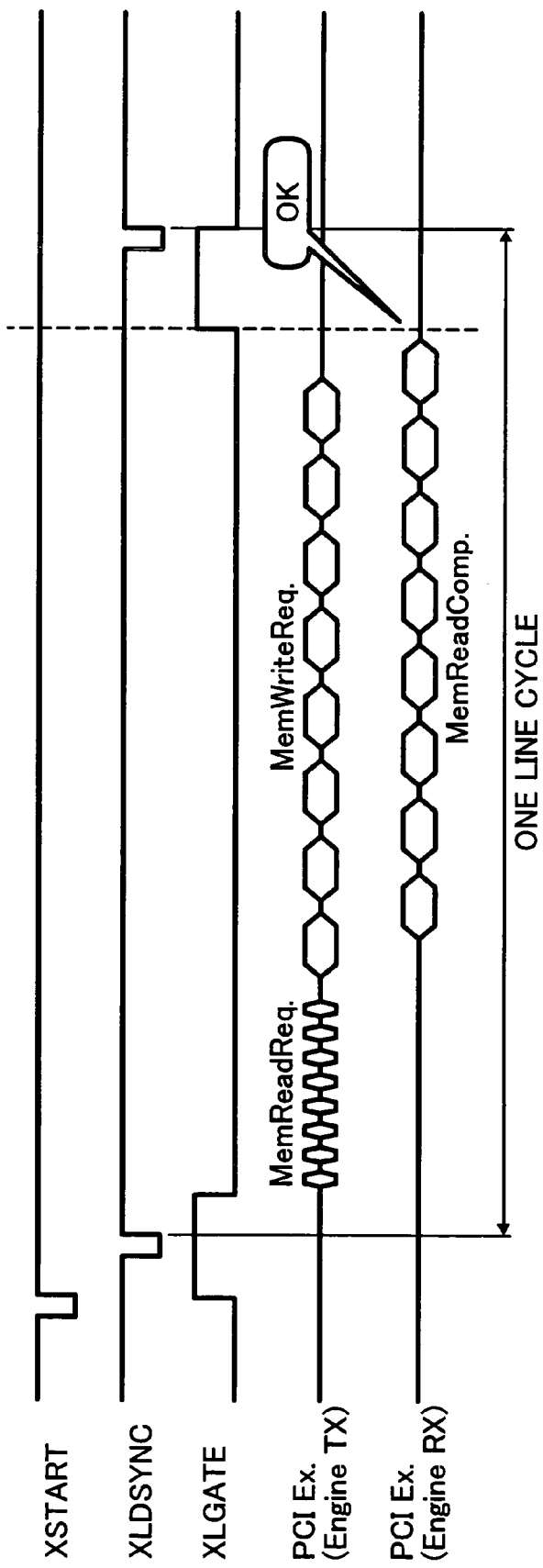

FIGS. 29A and 29B are schematic timing charts for explaining the order in which commands are issued according to a conventional technology. FIG. 29A depicts a case in which a read request command (MemReadReq.) and a write request command (MemWriteReq.) of data are sent without priority setting via the high-speed serial bus 7 in synchronism with a line synchronization signal (XLDSYNC) and read data (MemReadComp.) is received according to the MemReadReq. In this case, the receiving of the MemReadComp.

does not complete within a line valid period (XLGATE) due to the restrictions on timing of line synchronous transfer.

FIG. 29B depicts a case similar to the above example, in which priority of a TC of the memory read transaction (MemReadReq.) of the output section 4 (Engine TX) is set higher than that of the memory write transaction (MemWriteReq.) of the input section 3 (Engine RX), and strict priority is set so that the memory write transaction is issued after all of the memory read transactions are issued. As a result, the data can be output at a high speed even when line synchronous transfer is restricted by timing constraint, and can be received within the line valid period (XLGATE). Besides, a plurality of data can be transferred at the same time.

Even when commands are issued as described above in connection with FIG. 29B, sometimes the data transfer is not performed correctly due to variation in the effects of path delay (variation caused by a change in connection configuration, timing variation caused by competitive data transfer, etc.). Namely, due to variation in the effects of path delay, receiving of MemReadComp. may not complete within the line valid period (XLGATE).

Figure 30:
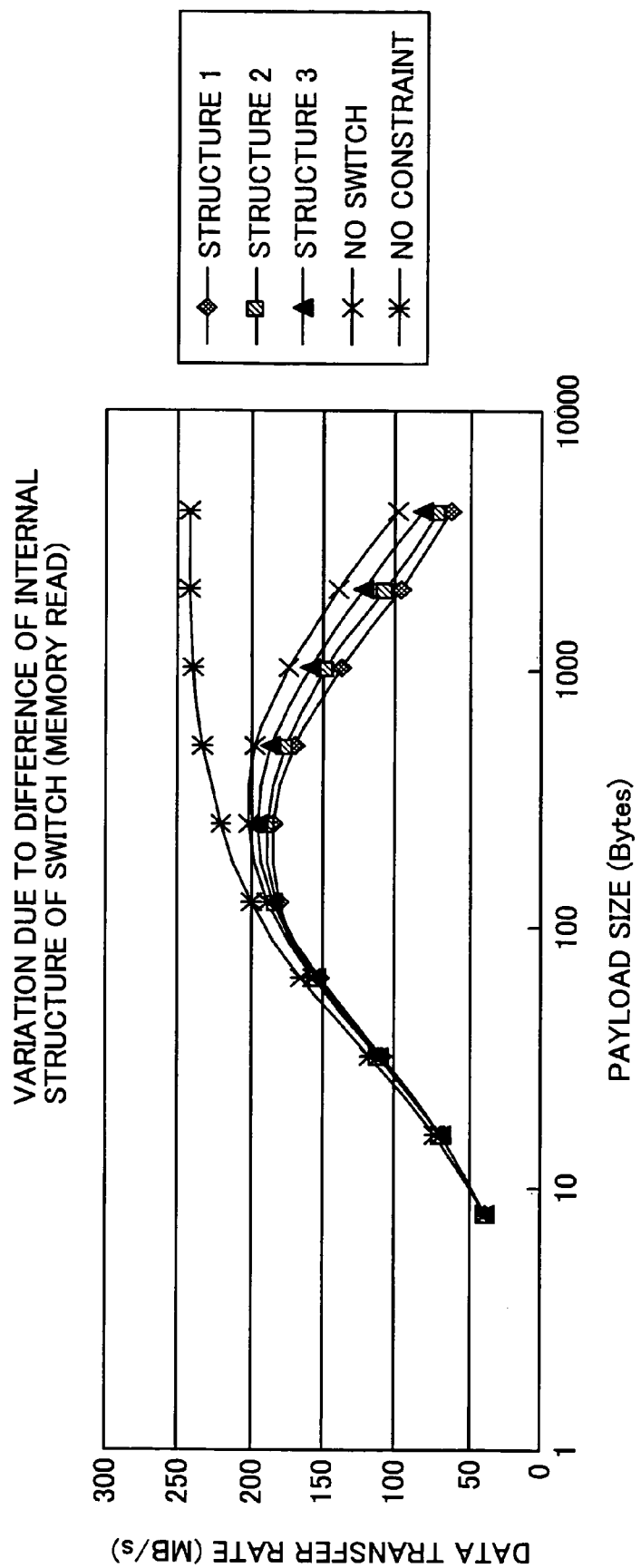
FIG. 30 a graph for explaining effects of delay in data transfer through a switch and that through no switch.

FIG. 30 is a graph for explaining the effects of delay in data transfer through a switch in comparison to data transfer without passing through a switch. When data is transferred through a switch, which is one of delay factors, delay varies depending on internal configuration of the switch (e.g., a type of memory; in FIG. 30, the difference among the structures 1 to 3). It can be understood from FIG. 30 that data transfer characteristics vary according to delay variation. There are several types of memory configuration such as a dual-port memory and a single-port memory.

Figure 31:
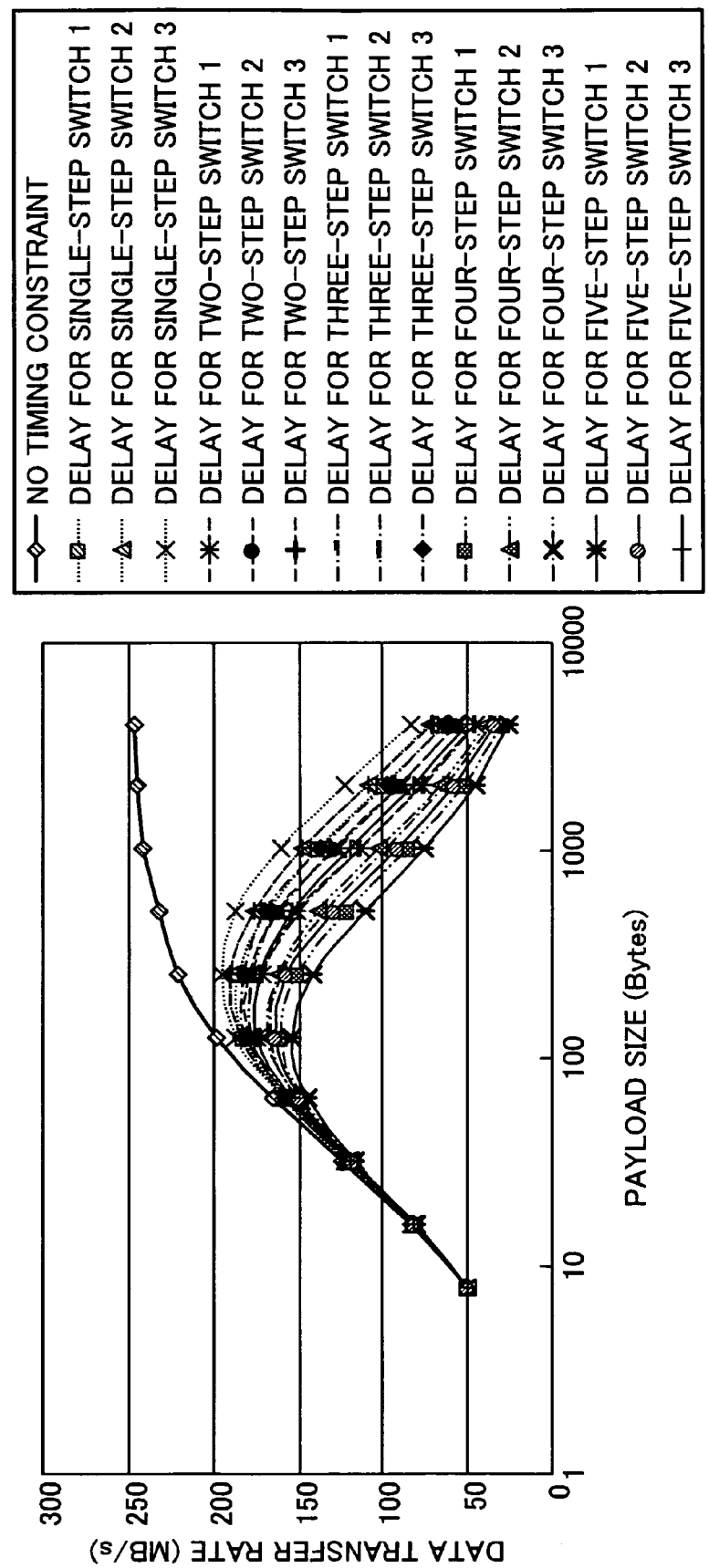
FIG. 31 is a graph for explaining effects of delay caused by a change in the number of switches through which data is transferred.

FIG. 31 is a graph for explaining the effects of delay due to a change in the number of switches through which data is transferred. Referring to FIG. 31, a change in the number of switching steps, a factor for path delay, causes large characteristic variations.

Figure 32:
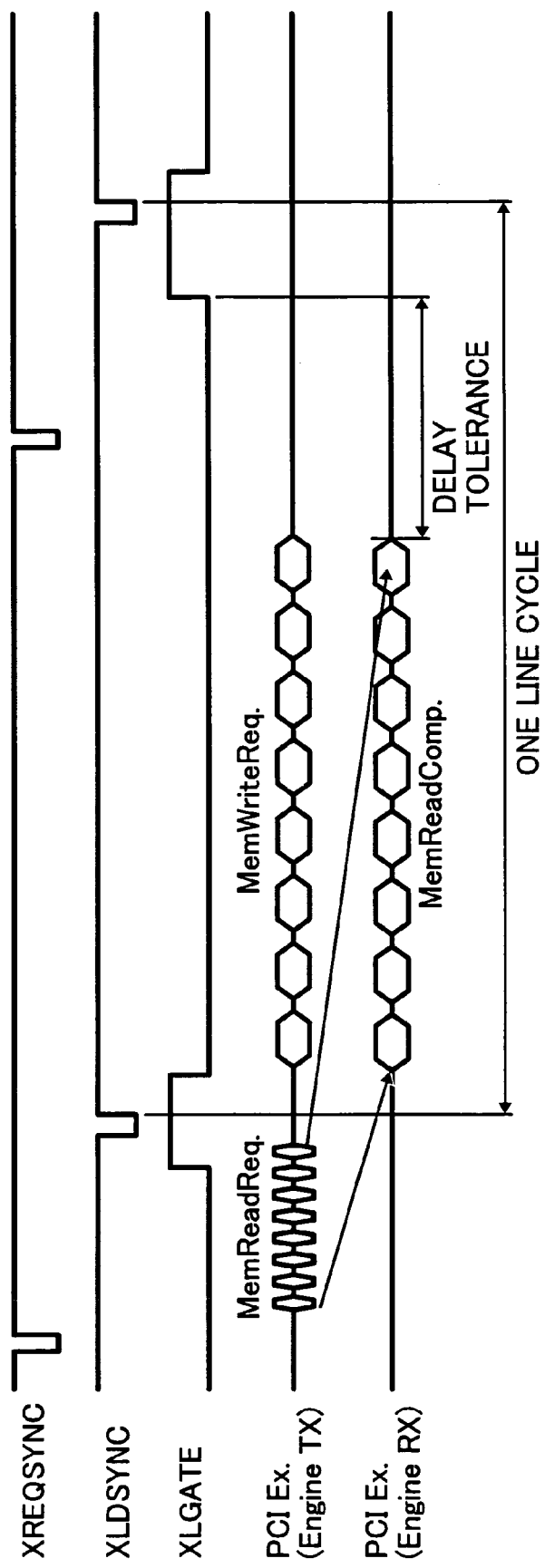
FIG. 32 is a timing chart for explaining the order in which commands are issued.

In the first embodiment, commands are issued according to a timing chart shown in FIG. 32. More specifically, the MemReadReq. is issued using a request-dedicated synchronization signal (XREQSYNC) which is independent from a line synchronization signal for data transfer (XLGATE). The XREQSYNC is, for example, a signal equivalent to the XLGATE in cycle but having a different phase. In the command issuing shown in FIG. 29B, the MemReadReq. is issued after the XLGATE falls down. In FIG. 32, by employing the XREQSYNC in addition to the XLGATE, the issuance of the MemReadReq. is completed before the XLGATE falls down. Thus, in the line valid period (XLGATE), delay tolerance for receipt of the MemReadComp. is increased, which reduces variation in the effects of path delay (variation caused by a change in connection configuration, timing variation caused by competitive data transfer, etc.), and improves the scalability. In other words, even when the timing of line synchronous transfer is restricted, the data can be output at a high-speed and transferred at the same time without wasting resources.

Figure 33:
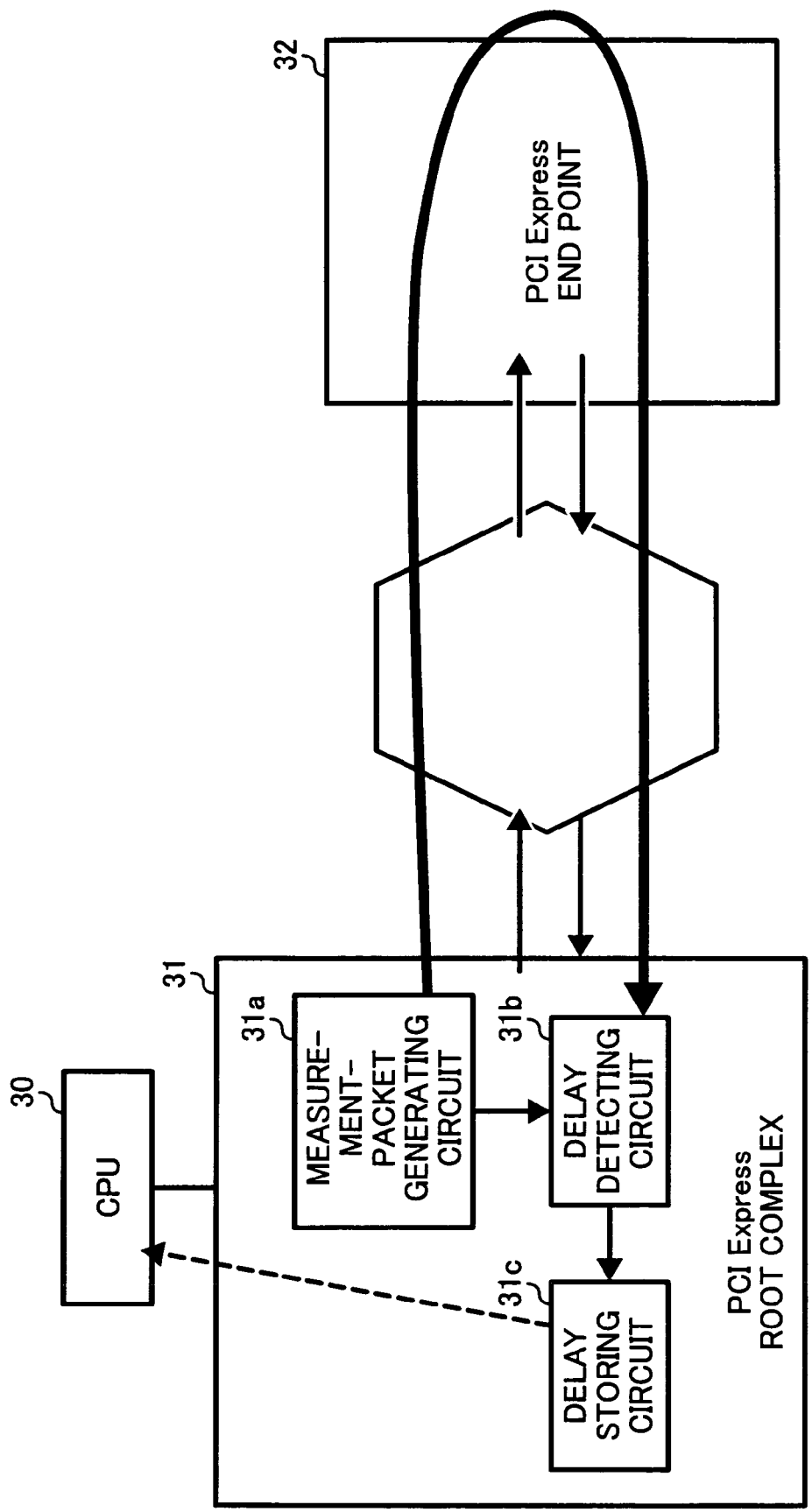
FIG. 33 is a schematic of a PCI EXPRESS system including a delay detecting section.

A phase difference between the XREQSYNC and the XLGATE can be measured with a delay measurement packet. FIG. 33 is a schematic of a PCI EXPRESS system including a delay detecting circuit. In FIG. 33, a root complex (phase measuring section) 31, which is connected to a CPU 30, functions as the control section, and includes a measurement packet generating circuit 31a for generating a measurement packet, a delay detecting circuit 31b for detecting a delay and a delay storing circuit 31c for storing the delay. The delay detecting circuit 31b detects the amount of delay (delay time) based on the output time of the delay measurement packet generated by the measurement-packet generating circuit 31a and the receipt time of a response packet returned from an end point 32. The detected delay amount is stored in the delay storing circuit 31c. Then, the CPU 30 controls the phase differences between the XREQSYNC and the XLGATE according to the delay stored in the delay storing circuit 31c. As a result, even when a dynamic change occurs in the delay, the XREQSYNC can always be generated based on the actual measurement value.

Figure 34:
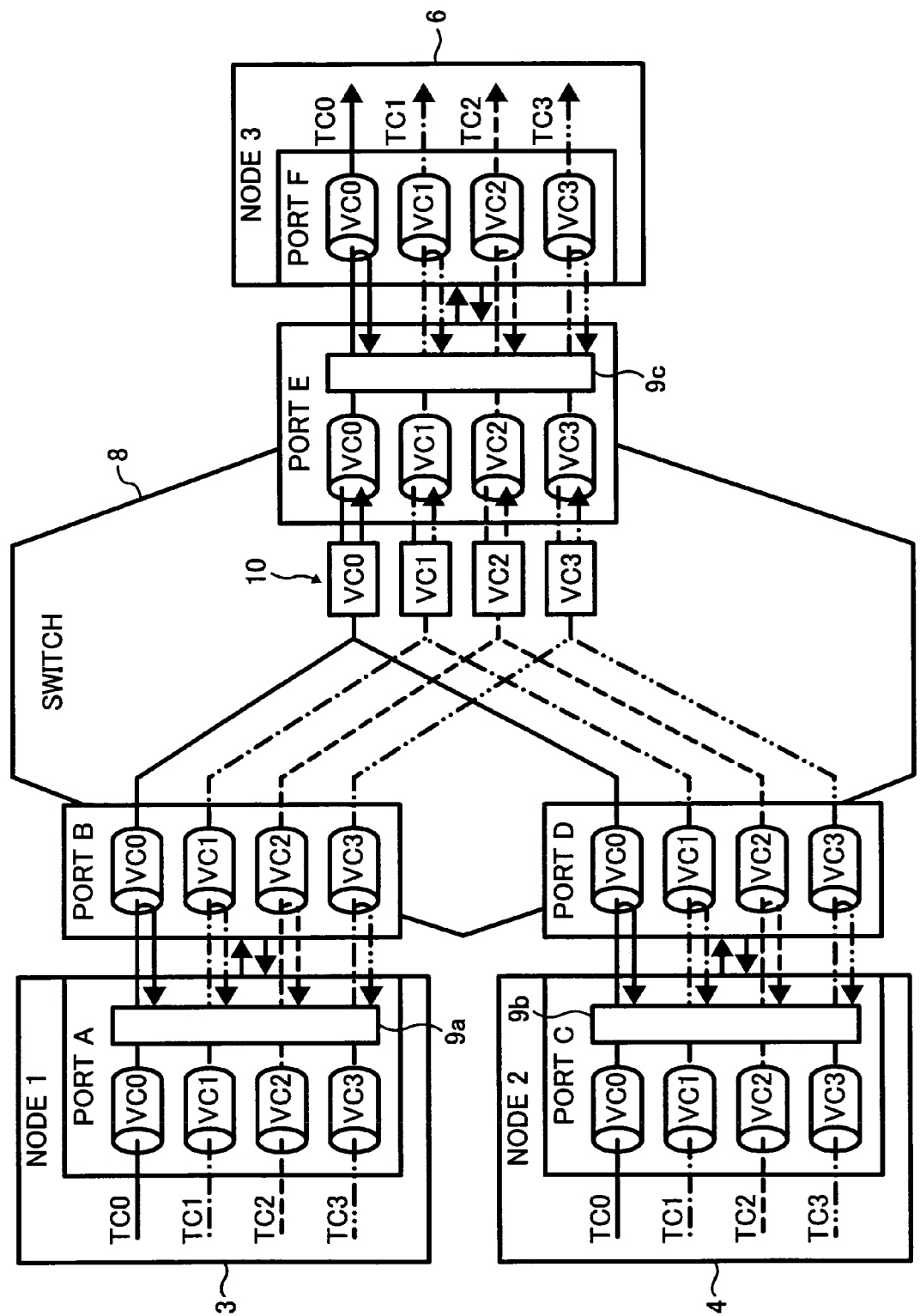
FIG. 34 is a schematic for explaining a data transmission system.

With reference to FIG. 34, a case is described below in which data is sent from the input section 3 to the storing section 6 passing the switch 8 (or the switch 15) via the high-speed serial bus 7 in synchronism with the line synchronization signal based on the priority setting that the data transfer from the storing section 6 to the output section 4 is performed prior to the data transfer from the input section 3 to the storing section 6. In the example, each of nodes 1, 2, and 3 is physically connected to the switch 8 by connecting each of ports A, C, and F provided on the nodes 1, 2, and 3 to each of ports B, D, and E provided on the switch 8. The nodes are devices. For example, the node 1 functions as the input section 3, the node 2 is the output section 4, and the node 3 is the storing section 6.

In this example, the input section 3 and the output section 4 function as initiators of the data transfer. The input section 3 employs the memory write transaction, and the output section 4 employs the memory read transaction. The same TCs are assigned to both the memory write and memory read transactions. More specifically, four TCs TC 0 to TC 3 are assigned to the memory write and memory read transactions. In FIG. 34, the two transactions with the same TCs are transferred through four different transmission paths. According to the PCI EXPRESS standard, the ports A, C, and F in the nodes 1, 2, and 3 are provided with virtual channels from VC 0 to VC 3, to which priority can be set. TC 0 to TC 3 are allocated to the VC 0 to VC 3 on the one-to-one base, and the combinations are previously decided. The VC 0 to VC 3 are allocated to the input ports B and D at the switch 8 and the output port E at the output section C, respectively. Virtual Channel arbitrations (VC arbitrations) 9a, 9b and 9c are provided on the ports A, C, and E, respectively, to serialize the data to be transferred. Namely, the VC arbitration 9a performs arbitration among VCs from VC 0 to VC 3 at the ports A and B; the VC arbitration 9b performs arbitration among VCs from VC 0 to VC 3 at the ports C and D; and the VC arbitration 9c performs arbitration among VCs from VC 0 to VC 3 at the ports E and F.

Further, a port arbitration 10 is provided in the switch 8 that is connected to the ports B and D and performs arbitration to the port E so that the data from the node 3 (the storing section 6) to the node 2 (the output section 4) is transferred prior to the data transfer from the node 1 (the input section 3) to the node 3 (the storing section 6). When two types of traffics, traffic from the port B and traffic from the port D, are found, the port arbitration 10 collects and sorts the traffics according to the TCs from TC 0 to TC 3. Namely, arbitration is performed according to the preset priority order for data transactions to be transferred through any of the VCs from VC 0 to VC 3 but to a different one of the input ports B and D. The remaining VCs not used based on a result of the arbitration above are serialized by means of arbitration 9c, and the data not transferred yet is sent to the node 3 (the storing section 6)

In this system based on the PCI EXPRESS standard, data is transferred from the node 3 (the storing section 6) to the node 2 (the output section 4) prior to data transfer from the node 1 (the input section 3) to the node 3 (the storing section 6). The port arbitration 10 in the system can employ any traffic distribution algorism selected from the Round-robin (RR), the Weighted Round-robin (WRR), and the Time Base Weighted Round-robin (TBWRR) including time concept control according to the PCI EXPRESS standard. When the WRR is employed, the payload size should preferably be taken into consideration. Even when the RR or the TBWRR is employed, the payload size should preferably be taken into consideration. By taking the payload size into the consideration, the system can control the priority more precisely.

Figure 35A:
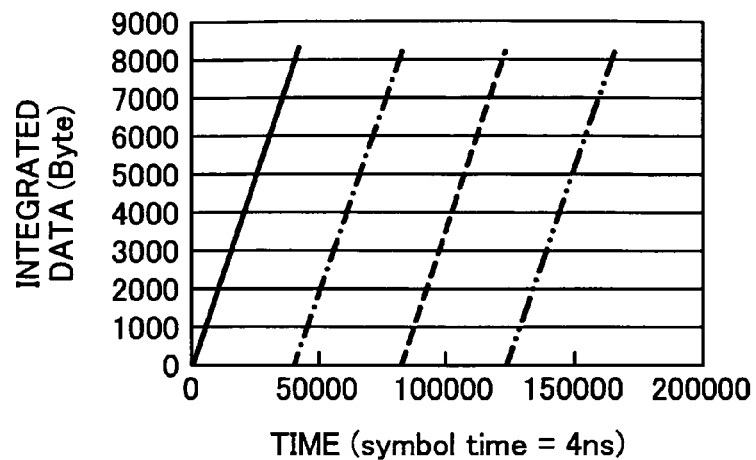
FIGS. 35A to 35C are graphs for explaining arbitration features.
Figure 35B:
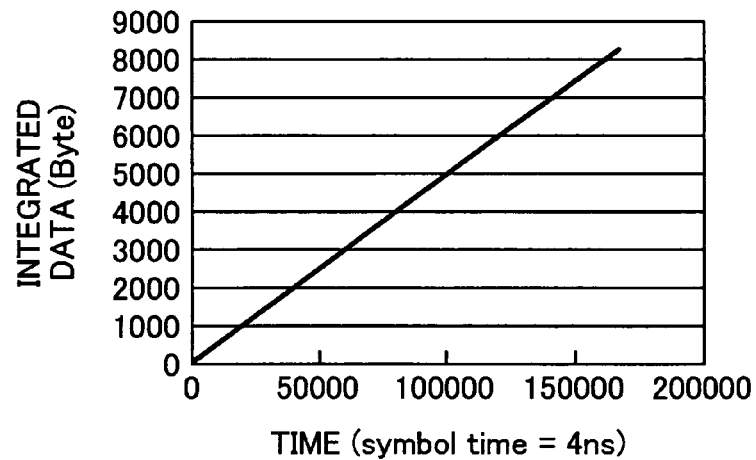
Figure 35C:
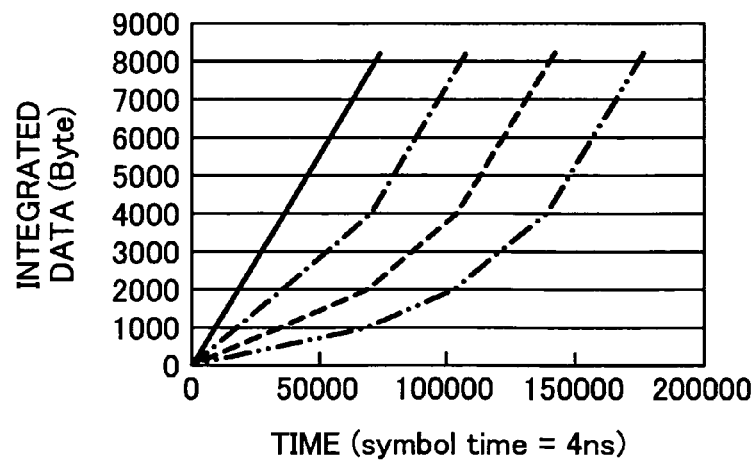

Basic features of the algorisms including the strict algorism employed when four types of data for TCs from TC 0 to TC 3 are transferred are described in brief with reference to FIGS. 35A to 35C. Graphs in FIGS. 35A to 35C indicate the integrated value of the amount of data because, from the results of measurement of arbitration performance, it is required to observe dynamical changes. In FIGS. 35A to 35C, the horizontal axis represents time and the vertical axis represents the amount of transferred data (integrated values), respectively. It is assumed that the payload size of each VC is 128 bytes (about 8000). FIG. 35A is a graph for explaining features of the strict algorism, the simple algorism in which the data is transferred sequentially. FIG. 35B is a graph for explaining features of the RR, in which four types of data are a separated into even pieces and transferred sequentially. In the graph, the four types of features are overlapped into one line of feature. FIG. 35C is a graph for explaining features of the WRR, where the data transfer rate is weighted at 1:2:4:8 corresponding to VC 0:VC 1:VC 2:VC 3. In this case, when one type of TC is completely transferred, the data transfer rate changes to 8:4:2. Then, when another type of TC is completely transferred, the data transfer rate changes to 8:4. The TBWRR further includes the time concept control in addition to the WRR.

Figure 36:
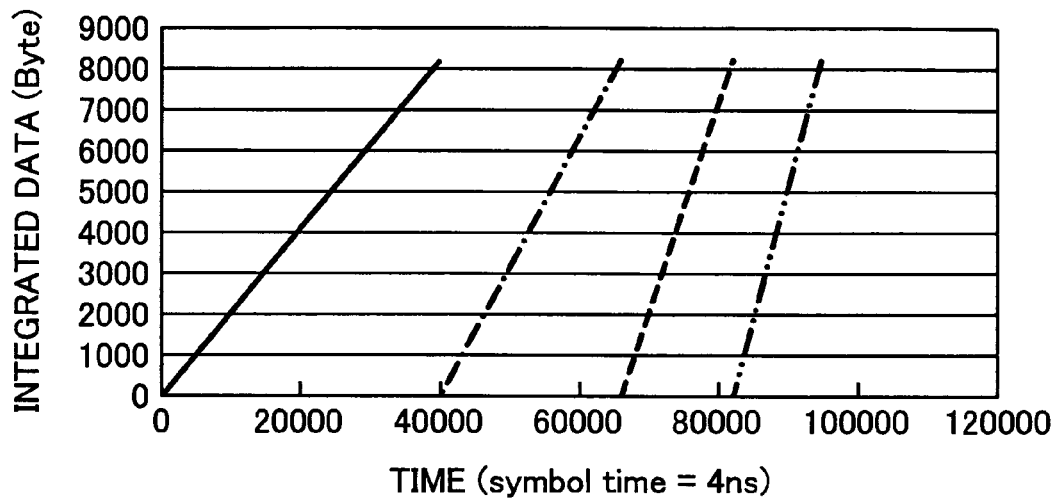
FIG. 36 is a graph for explaining basic properties of a payload.

FIG. 36 is a graph for explaining basic properties of a payload when the payload is measured with the strict algorism. As shown in FIG. 36, the smaller the payload size is, the lower the data transfer rate becomes. The same is true for payload characteristics when another algorism for arbitration is employed. Therefore, the payload size should be taken into consideration, particularly in the WRR where the data transfer rate is determined according to the ratio described above.

Consider a case that the switch 8 based on the PCI EXPRESS standard is located in a path of the high-speed serial bus 7, the input section 3, the output section 4, and the storing section 6 are connected to separate ports of the switch 8, respectively, and different TCs are assigned to two transactions to transfer data via the high-speed serial bus 7 from the input section 3 to the storing section 6 in synchronism with the line synchronization signal and, at the same time, to transfer data from the storing section 6 to the output section 4 in synchronism with the line synchronization signal. In this case, it is preferable, referring to FIG. 34, to set the arbitration 9c for the VCs of the port E at the strict priority so that the data from the storing section 6 to the output section 4 is transferred prior to the data transfer from the input section 3 to the storing section 6.

When, as shown in FIGS. 18, 19, 20, 23, and 27, data is directly sent from the processing section 5 to the storing section 6, and from the storing section 6 to the output section 4, the data is basically sent via the high-speed serial bus 7 from the processing section 5 to the storing section 6 in synchronism with the line synchronization signal, and, at the same time, the data is sent from the storing section 6 to the output section 4 in synchronism with the line synchronization signal. In this case, it is preferable to transfer the data from the storing section 6 to the output section 4 prior to transfer from the processing section 5 to the storing section 6.

More specifically, in the first embodiment, the processing section 5 and the output section 4 function as initiators of the data transfer, the memory write transaction is used in the processing section 5 and the memory read transaction for data transfer is used in the output section 4, and different TCs are allocated to the two types of traffics. By setting the VCs, it is possible to set the TC for the memory write transaction in the output section 4 at a higher priority level than that for the memory read transaction in the processing section 5 in priority. In addition, the strict priority is set so that the memory write transaction is issued after all of the memory read transactions are issued. As a result, the data can be output at a high speed even when timing of the line synchronous transfer is restricted, and a plurality of data can be sent at the same time.

Figure 28:
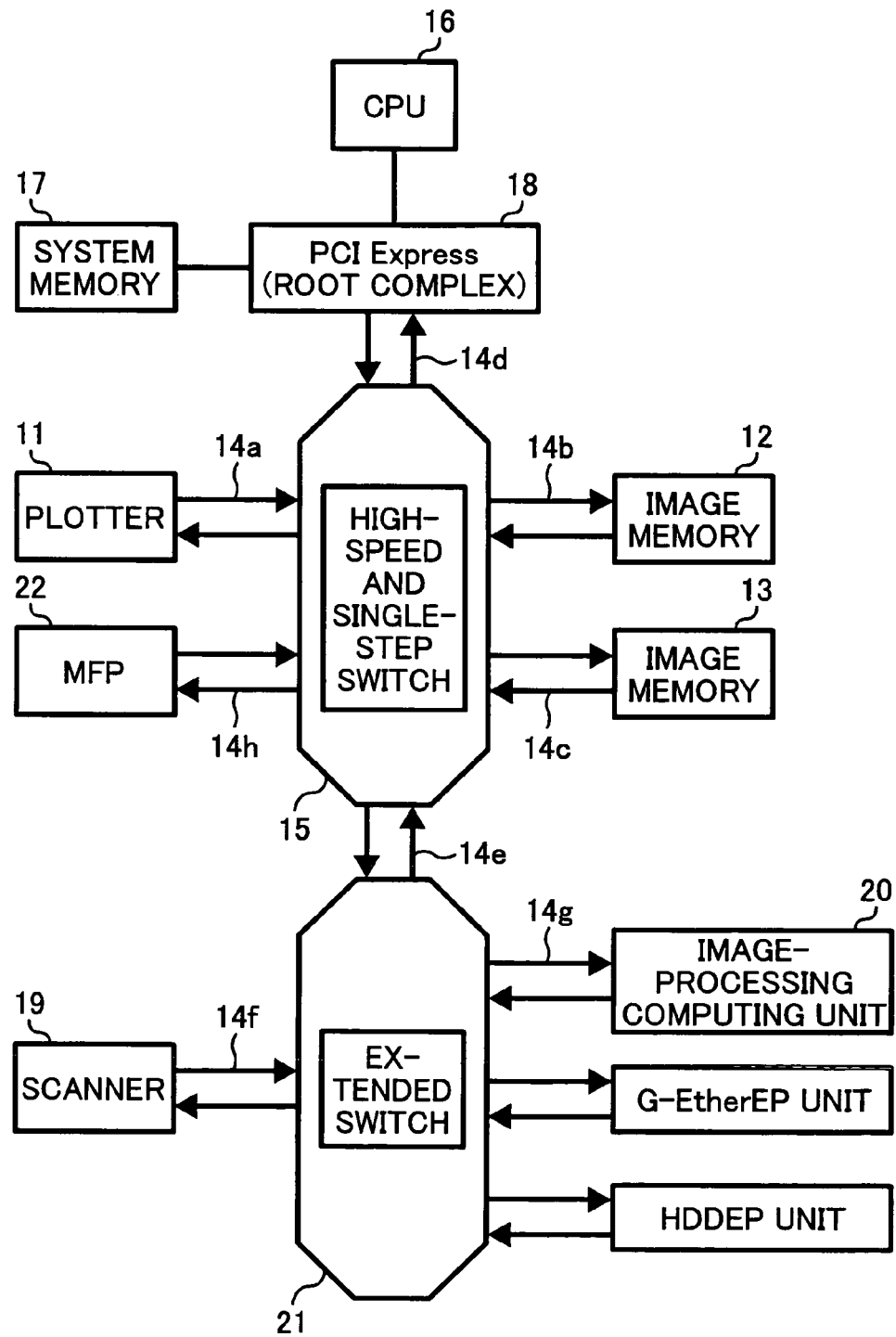
FIG. 28 is a schematic of an optimal configuration of the information processing system.

The configuration shown in FIG. 28 is applicable also in this case.

A second embodiment of the present invention is described below with reference to FIGS. 37 to 44. Parts corresponding to those in the first embodiment are denoted with the same reference numerals, and the same description is not repeated.

Data transfer in the second embodiment is described below. Like in the first embodiment, data is directly sent from the input section 3 to the storing section 6. In an example for data transfer applicable to the configuration shown in FIGS. 16, 17, 19, 23, and 27 in which the data is directly sent from the storing section 6 to the output section 4 via the high-speed serial bus 7, the data is basically sent from the input section 3 to the storing section 6 in synchronism with the line synchronization signal and at the same time the data is sent from the storing section 6 to the output section 4 in synchronism with the line synchronization signal.

Figure 37:
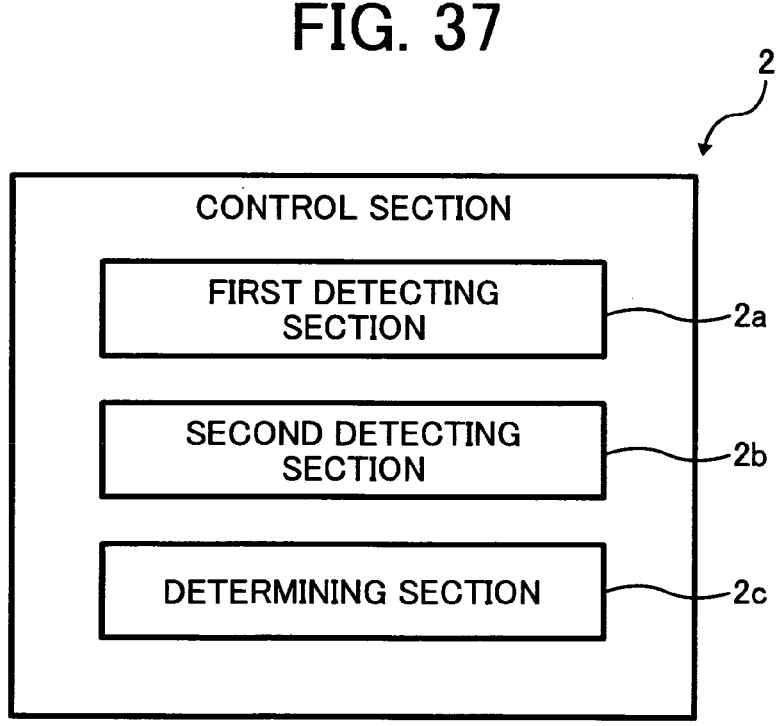
FIG. 37 is a block diagram of a control section according to a second embodiment of the present invention.

FIG. 37 is a block diagram of the control section 2 according to the second embodiment. The control section 2 in the second embodiment includes a first detecting section 2a, a second detecting section 2b, and a determining section 2c.

Figure 38:
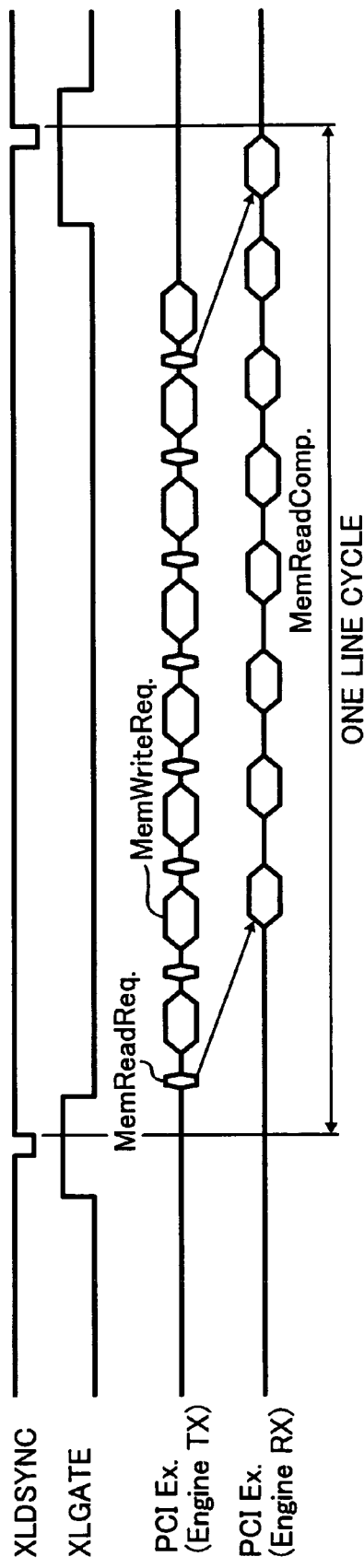
FIG. 38 is a timing chart for explaining the order in which commands are issued.
Figure 39:
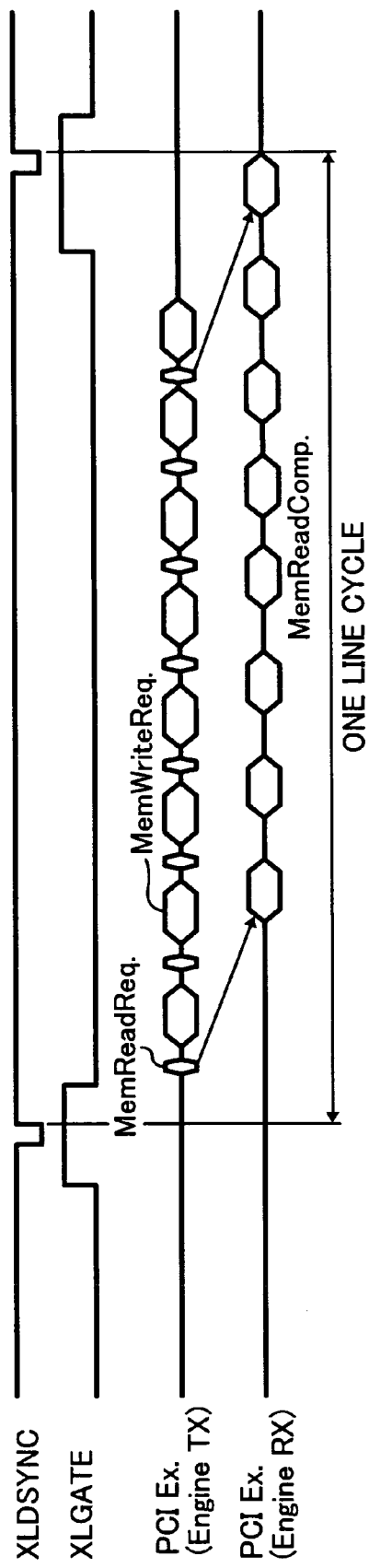
FIG. 39 is another timing chart for explaining the order in which commands are issued.

FIG. 38 is a timing chart for explaining the order in which commands are issued. In FIG. 38, the MemReadReq. and the MemWriteReq. are sent via the high-speed serial bus 7 in synchronism with the XLDSYNC without setting priority for both the commands, and MemReadComp. is received according to the MemReadReq.

When the commands are issued as described above in connection with FIG. 38, sometimes the data transfer is not performed correctly due to variation in the effects of path delay (variation caused by a change in connection configuration, timing variation caused by competitive data transfer, etc.). Namely, due to variation in the effects of path delay, receiving of MemReadComp. may not complete within the line valid period (XLGATE).

Figure 40:
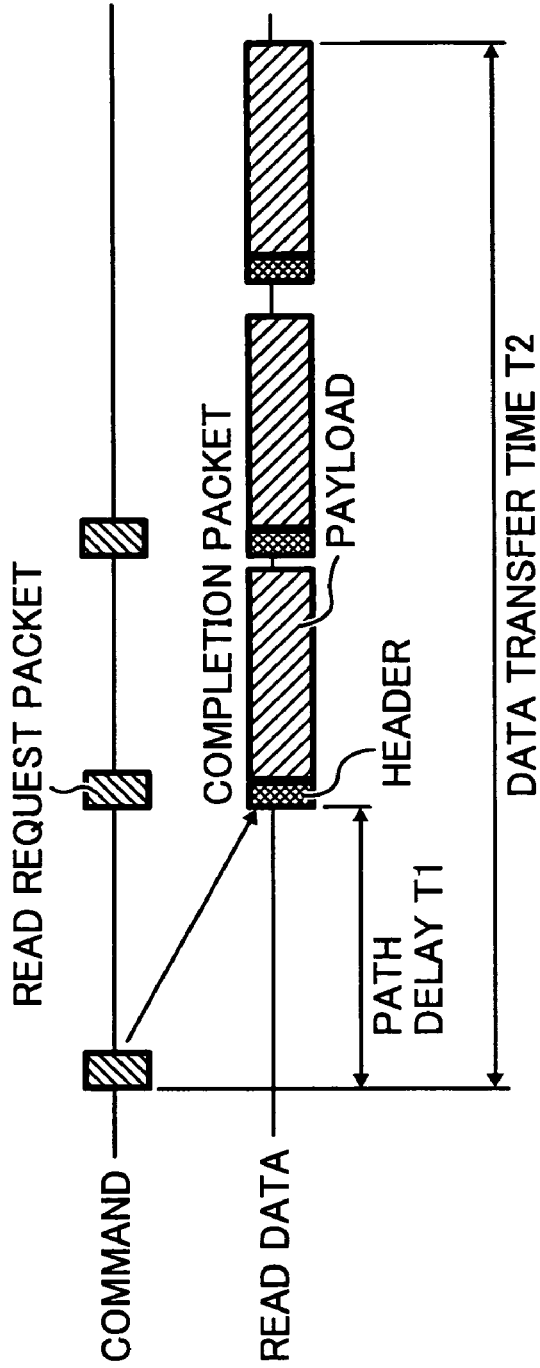
FIG. 40 is a schematic for explaining a relation between a request packet and a corresponding completion packet when a command is issued.

FIG. 40 is a schematic for explaining a relation between a request packet and a completion packet corresponding thereto at command issuing. In the example, when the read request packet is sent, the completion packet corresponding to the request packet is returned. The completion packet is made up of a header and a payload portion. When a path delay occurs between the MemReadReq. and the MemReadComp., the MemReadComp. may not be received within the line valid period (XLGATE) due to effects such as a path delay caused by the read request packet and the completion packet.

Figure 41:
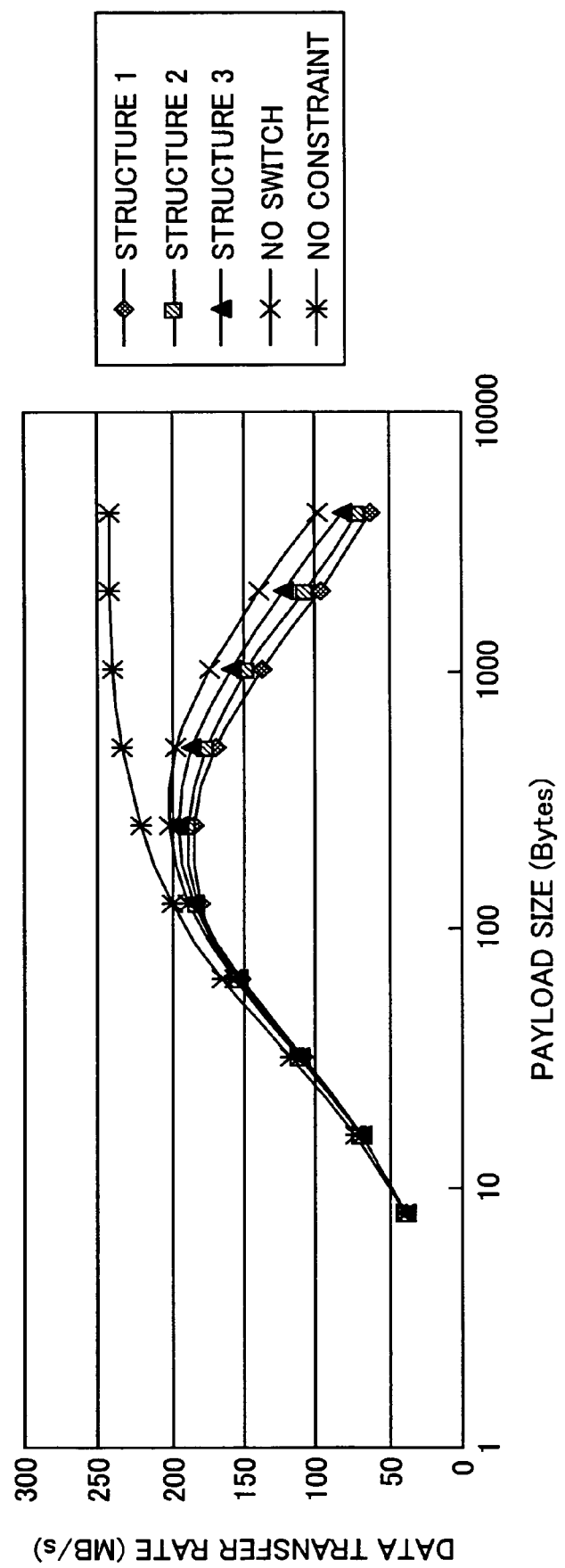
FIG. 41 is a graph for explaining effects of delay in data transfer through a switch and that through no switch.

FIG. 41 is a graph for explaining the effects of delay in data transfer through a switch in comparison to data transfer without passing through a switch. It can be understood form FIG. 41 that, when data passes through a switch, which is one of delay factors, delay varies depending on internal configuration of the switch (e.g., a type of memory; in FIG. 41, the difference among the structures 1 to 3), and data transfer characteristics vary according to delay variation. There are several types of memory configuration such as a dual-port memory and a single-port memory.

Figure 42:
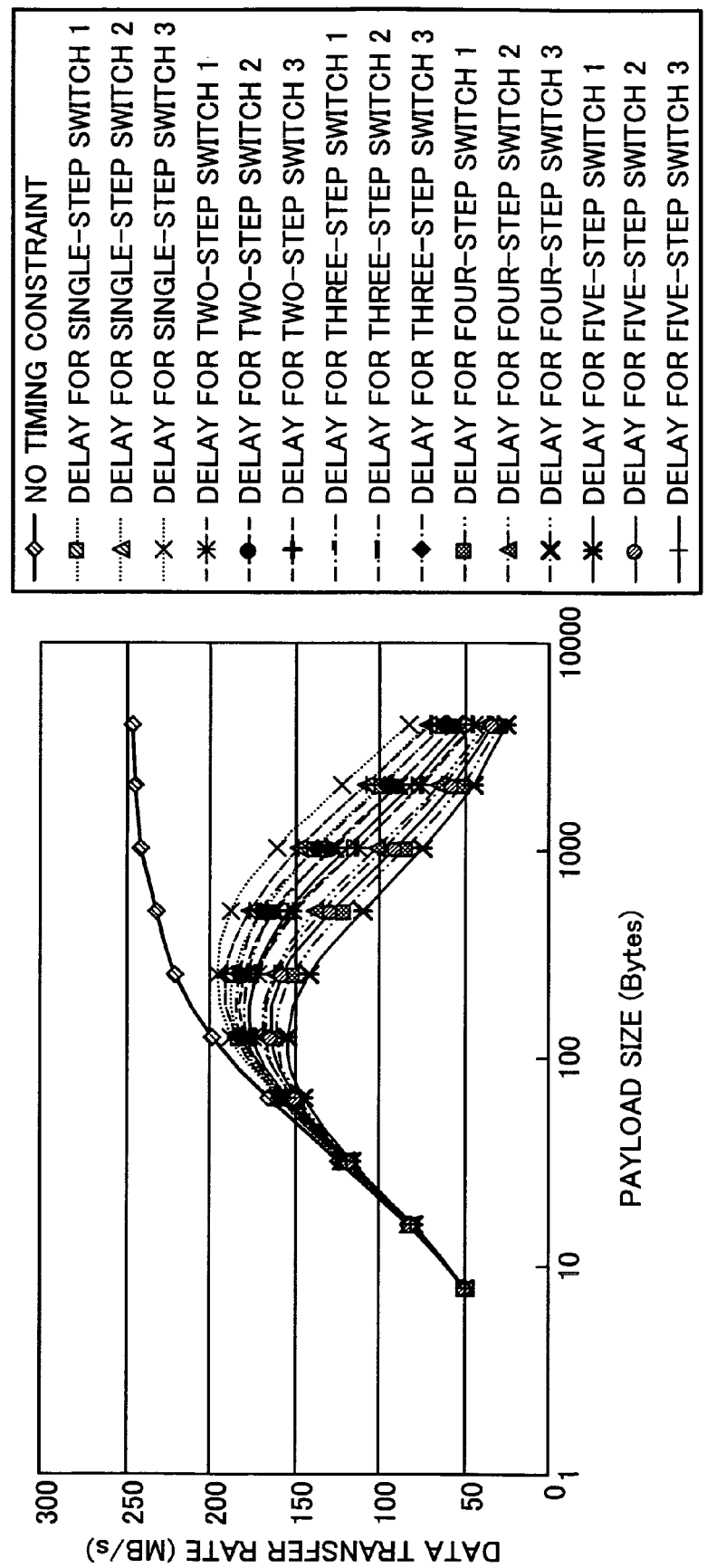
FIG. 42 is a graph for explaining effects of a delay caused by a change in the number of switches through which data is transferred.

FIG. 42 is a graph for explaining the effects of delay due to a change in the number of switches through which data is transferred. Referring to FIG. 42, a change in the number of switching steps, a factor for path delay, causes large characteristic variations.

In the conventional system, as the system expands, an optimum payload size is changed, so that the conventional system doesn't have scalability. In addition, due to the effects of path delay, the conventional system cannot keep at a sufficient data transfer rate, even when the payload size is large. Therefore, in the second embodiment, the payload size is determined in the way described below.

As shown in FIG. 40, time differences T1 and T2 are measured at first. T1 represents path delay from when transmission of a read request packet is started until a header of a completion packet corresponding to the read request packet arrives, and T2 represents a data transfer time from when transmission of the read request packet is started until a final completion packet for all of target data is received. The header size of the completion packet is A byte, and the payload size of the completion packet is B byte.

Figure 43:
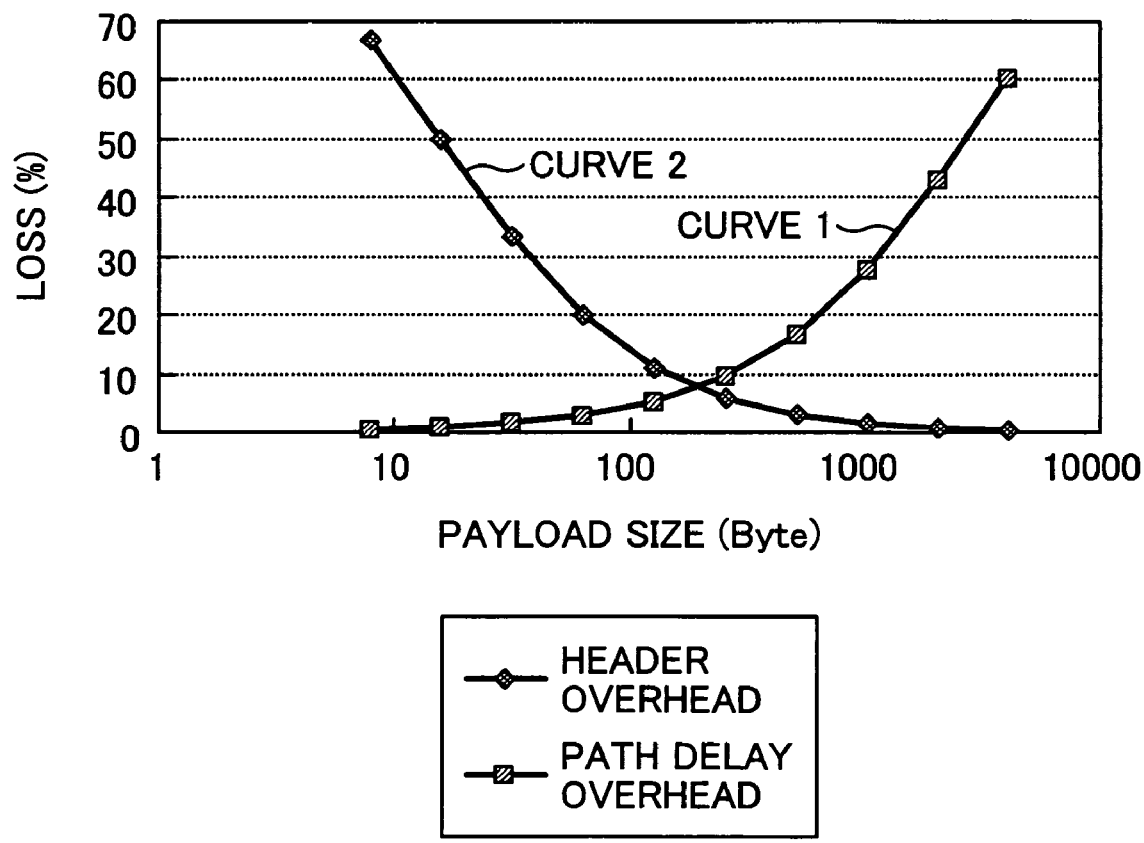
FIG. 43 is a graph for explaining loss characteristics for each factor.

Next, the first detecting section 2a in the control section 2 detects a curve 1 representing path delay overhead by calculating a completion packet-to-payload size ratio (T1/T2). The second detecting section 2b detects a curve 2 representing header overhead by calculating a completion packet-to-payload size ratio (A/(A+B)). FIG. 43 is a graph for explaining loss characteristics for each delay factor. A cross-point of the curve 1 and the curve 2 is located between 128 and 256 bytes. It can be understood that, when the payload size is the value at the cross-point or below, the loss against a theoretical value for the data transfer rate is small. Therefore, in the second embodiment, the determining section 2c of the control section 2 determines a payload size that is at the cross-point or below as data to be transferred at first. Thus, the data is transferred with a certain payload size decided by taking into consideration a balance of a path delay and a protocol overhead, and the balance is decided according to the value at the cross-point between the curve 1 representing the completion packet-to-payload size ratio (T1/T2) and the curve 2 representing the completion packet-to-payload size ratio (A/(A+B)) or below. As a result, a high-speed data transfer can be realized.

As shown in FIG. 41, the larger the delay is, the smaller the payload size at the peak thereof is, and vice versa. The payload size at the peak thereof represents the cross-point of two curves shown in FIG. 43. Namely, the larger the delay is, the smaller the payload size at the cross-point is, and vice versa. Therefore, it is preferable that the payload size be variable according to path delay. By changing the payload size according to path delay, the data transfer is always kept at the highest rate even when a dynamic change of delay occurs.

As shown in FIG. 42, the larger the number of switching steps is, the smaller the payload size at the peak thereof is, and vice versa. Therefore, it is preferable to change the payload size in response to the number of switching steps in a path. By changing the payload size in response to the number of switching steps, the data transfer is always kept at the highest rate even when a dynamic change of delay occurs.

By setting a register in a configuration space using software, the payload size is variable according to path delay and the number of switching steps (refer to FIG. 10). Normally, a change of the path delay or the number of switching steps occurs when a connection is changed. Therefore, it is effective to optimize the payload size in response to the path delay and the number of switching steps, when the PCI EXPRESS is re-configured.

The payload size for data transfer can be in a range from a quarter to four times as large as the value at the cross-point between the curve 1 and the curve 2. As shown in FIG. 43, when the payload size is a value outside of the range defined above, the loss increases by 1.2 times or more as compared with the optimum value, so that the payload size with the value outside of the range is not practically helpful. In the second embodiment, achieving a balance between the path delay and the header overhead ensures a high-speed data transfer.

Figure 44:
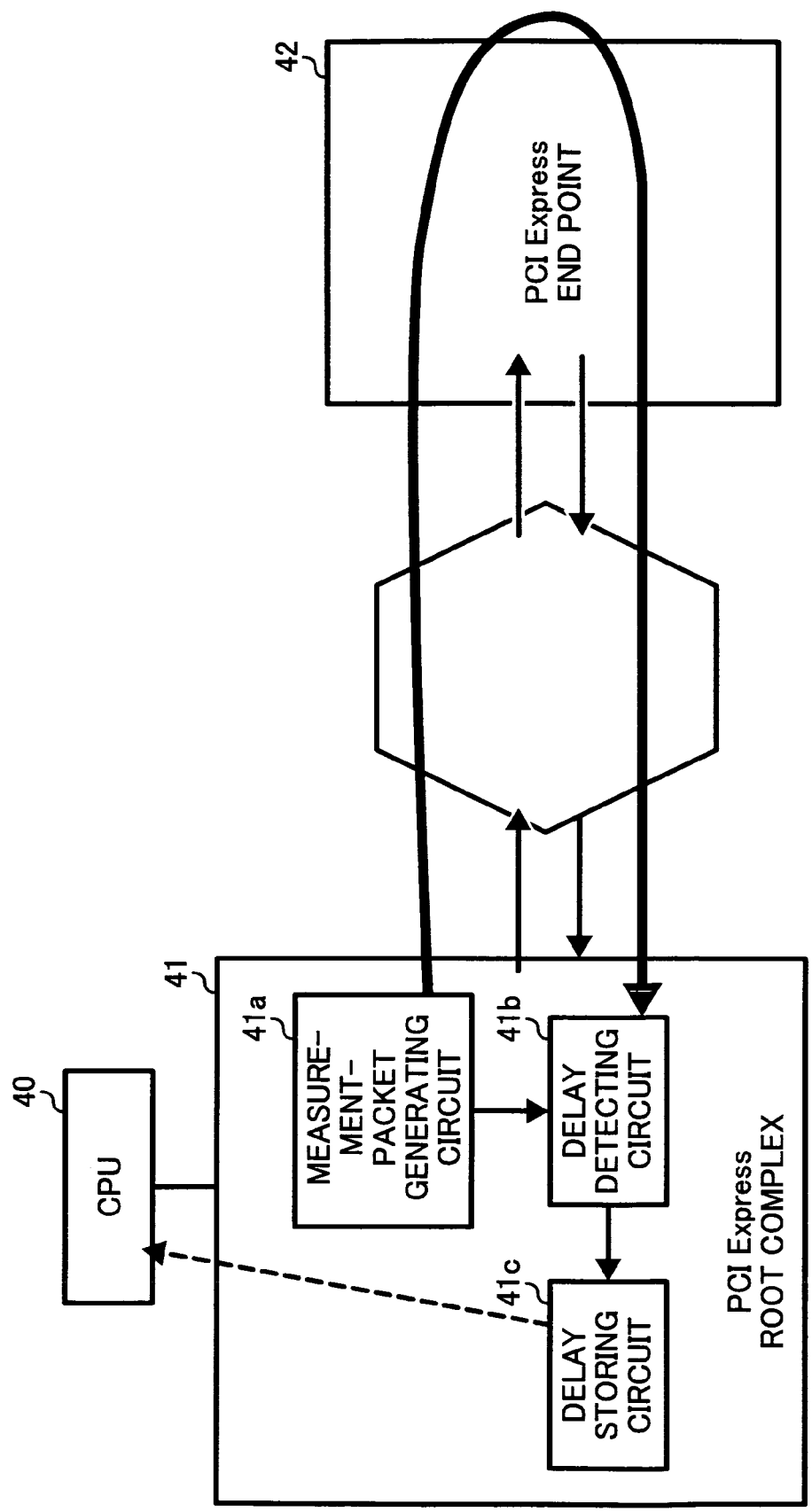
FIG. 44 is a schematic of a PCI EXPRESS system including a delay detecting section.

A root complex (time difference measuring section) 41 shown in FIG. 44, i.e., the control section, which is connected to a CPU 40, can measure the time differences T1 and T2. T1 represents a time difference from when transmission of the read request packet is started until when the head of the completion packet corresponding to the read request packet arrives, and T2 represents a time difference from when transmission of the read request packet is started until the last completion packet for all of target data is received. The root complex (time difference measuring section) 41 functioning as the control section is connected to the CPU 40, and includes a measurement packet generating circuit 41a that generates a packet for measurement, a delay detecting circuit 41b that detects the amount of delay, and a delay storing circuit 41c that storing the amount of delay. The delay detecting circuit 41b detects the time differences T1 and T2 based on output time of the packet for measurement generated at the measurement packet generating circuit 41a and receipt time of a returned packet from an end point 42. The detected T1 and T2 are stored in the delay storing circuit 41c. A plurality of packets each having a different a payload size can be used for the measurement. As a result, the cross-point of the two curves can be automatically expected based on the actual measurement value.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
   a high-speed serial bus that transmits and receives data independently over communication channels via a tree-structured network including a point-to-point connection;
   a first detecting unit that detects a first curve indicating a completion packet-to-payload size ratio T1/T2 based on a time difference T1 from when transmission of a request packet via the high-speed serial bus is started until a header of a completion packet corresponding to the request packet arrives and a time difference T2 from when transmission of the request packet is started until a last completion packet of all target data is received;
   a time difference measuring unit that measures the time difference T1 and the time difference T2, the first detecting unit configured to detect the first curve based on the time differences T1 and T2 measured by the time difference measuring unit;
   a second detecting unit that detects a second curve indicating a completion packet-to-payload size ratio A/(A+B) based on a header size A of the completion packet and a payload size B of the completion packet;

a determining unit that determines a payload size for packet transfer based on the first curve and the second curve; and wherein T1, T2, A and B are real positive numbers greater than zero.

2. The information processing system according to claim 1, wherein determined payload size is equal to or less than a value corresponding to a cross-point of the first curve and the second curve.

3. The information processing system according to claim 1, wherein determined payload size is in a range from a quarter to four times of a payload size corresponding to a cross-point of the first curve and the second curve.

4. The information processing system according to claim 1, wherein the determining unit varies the payload size according to path delay.

5. The information processing system according to claim 1, wherein the determining unit varies the payload size according to number of switches in a path.

6. The information processing system according to claim 4, wherein the determining unit changes the payload size when the high-speed serial bus is reconfigured.

7. The information processing system according to claim 1, wherein the time difference measuring unit includes
   a measurement-packet generating unit that generates a measurement packet;
   a delay detecting unit that detects a delay amount based on output time of the measurement packet and receipt time of a packet returned in response to the measurement packet from an end point; and
   a delay storing unit that stores the delay amount.

8. The information processing system according to claim 7, wherein the measurement-packet generating unit generates a plurality of measurement packets each having a different payload size.

9. The information processing system according to claim 1, wherein the high-speed serial bus complies with a high-speed serial peripheral component interconnect interface.

* * * * *